United States Patent
Cherkasova et al.

(10) Patent No.: US 8,145,731 B2
(45) Date of Patent: Mar. 27, 2012

(54) SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD

(75) Inventors: Ludmila Cherkasova, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2500 days.

(21) Appl. No.: 10/738,273

(22) Filed: Dec. 17, 2003

(65) Prior Publication Data

US 2005/0138170 A1      Jun. 23, 2005

(51) Int. Cl.
G06F 15/173      (2006.01)
G06F 15/16       (2006.01)
G06F 15/177      (2006.01)

(52) U.S. Cl. ......... 709/220; 709/223; 709/224; 713/300

(58) Field of Classification Search .......... 709/217–228; 713/300
See application file for complete search history.

(56) References Cited

U.S. PATENT DOCUMENTS

| | | | |
|---|---|---|---|
| 5,603,029 A | 2/1997 | Aman et al. | |
| 5,732,239 A | 3/1998 | Tobagi et al. | |
| 5,734,119 A | 3/1998 | France et al. | |
| 5,815,662 A | 9/1998 | Ong | |
| 5,828,847 A | 10/1998 | Gehr | |
| 5,890,162 A * | 3/1999 | Huckins | 709/203 |
| 5,953,707 A | 9/1999 | Huang et al. | |
| 6,067,107 A | 5/2000 | Travaille et al. | |
| 6,101,547 A | 8/2000 | Mukherjee et al. | |
| 6,178,480 B1 | 1/2001 | Tobagi et al. | |
| 6,263,361 B1 | 7/2001 | Hoyer et al. | |
| 6,279,039 B1 | 8/2001 | Bhat et al. | |
| 6,282,569 B1 | 8/2001 | Wallis | |
| 6,292,834 B1 | 9/2001 | Ravi et al. | |
| 6,356,947 B1 | 3/2002 | Lutterschmidt | |
| 6,434,621 B1 | 8/2002 | Pezzillo et al. | |
| 6,438,592 B1 | 8/2002 | Killian | |
| 6,516,350 B1 | 2/2003 | Lumelsky | |
| 6,529,950 B1 | 3/2003 | Lumelsky | |
| 6,571,288 B1 | 5/2003 | Sarukkai | |
| 6,606,658 B1 | 8/2003 | Uematsu | |
| 6,728,748 B1 | 4/2004 | Mangipudi | |
| 6,757,735 B2 * | 6/2004 | Apostolopulos et al. | 709/231 |
| 6,996,618 B2 * | 2/2006 | Apostolopoulos et al. | 709/227 |
| 7,216,165 B2 * | 5/2007 | Dalal et al. | 709/224 |
| 7,310,681 B2 | 12/2007 | Cherkasova | |
| 7,424,528 B2 * | 9/2008 | Cherkasova et al. | 709/224 |
| 7,610,381 B2 * | 10/2009 | Cherkasova et al. | 709/226 |

(Continued)

OTHER PUBLICATIONS

U.S. Appl. No. 10/867,392, Notice of Allowance dated Apr. 14, 2011 (pp. 1-10).

(Continued)

*Primary Examiner* — Haresh N Patel

(57) ABSTRACT

A method comprises receiving, into a capacity planning system, workload information representing an expected workload of client accesses of streaming media files from a site. The method further comprises the capacity planning system determining, for at least one server configuration, how many servers of the at least one server configuration to be included at the site for supporting the expected workload in a desired manner.

33 Claims, 14 Drawing Sheets

U.S. PATENT DOCUMENTS

| | | | |
|---|---|---|---|
| 7,797,439 | B2 | 9/2010 | Cherkasova |
| 7,953,843 | B2 | 5/2011 | Cherkasova |
| 2002/0083124 | A1 | 6/2002 | Knox et al. |
| 2002/0091722 | A1 | 7/2002 | Gupta et al. |
| 2002/0129048 | A1 | 9/2002 | Qiu et al. |
| 2002/0150102 | A1 | 10/2002 | Janko et al. |
| 2002/0156552 | A1 | 10/2002 | Whiting |
| 2002/0199014 | A1* | 12/2002 | Yang et al. ............. 709/238 |
| 2003/0097443 | A1 | 5/2003 | Gillett et al. |
| 2003/0115244 | A1 | 6/2003 | Molloy et al. |
| 2003/0158913 | A1* | 8/2003 | Agnoli et al. ............. 709/219 |
| 2003/0208563 | A1* | 11/2003 | Acree et al. ............. 709/219 |
| 2003/0220998 | A1* | 11/2003 | Jennings et al. ............. 709/224 |
| 2004/0054780 | A1* | 3/2004 | Romero ............. 709/226 |
| 2004/0111509 | A1* | 6/2004 | Eilam et al. ............. 709/224 |
| 2004/0162901 | A1* | 8/2004 | Mangipudi et al. ............. 709/225 |
| 2004/0250248 | A1* | 12/2004 | Halpern et al. ............. 718/100 |
| 2005/0132083 | A1* | 6/2005 | Raciborski et al. ............. 709/232 |
| 2005/0278453 | A1 | 12/2005 | Cherkasova |
| 2007/0169149 | A1* | 7/2007 | Jennings et al. ............. 725/58 |

OTHER PUBLICATIONS

U.S. Appl. No. 10/867,392, Final Rejection dated Jul. 26, 2010 (pp. 1-29 and attachments).

U.S. Appl. No. 10/867,392, Non-Final Rejection dated Feb. 3, 2010 (pp. 1-22 and attachment).

U.S. Appl. No. 10/867,392, Final Rejection dated Dec. 24, 2008 (pp. 1-28 and attachments).

U.S. Appl. No. 10/867,392, Non-Final Rejection dated Mar. 26, 2008 (pp. 1-23 and attachments).

Acharya, S. et al., "Characterizing User Access to Videos on the World Wide Web," Part of the IS&T/SPIE Conference on Multimedia computing and Networking 2000, SPIE vol. 3969, 2000, pp. 130-141, Dec. 31.

Almeida, J. et al., "Analysis of Educational Media Server Workloads," Proc. 11th Int'l. Workshop, 2001, 10 pages, Dec. 31.

U.S. Appl. No. 10/306,279, Cherkasova et al.

U.S. Appl. No. 10/660,978, Cherkasova et al.

U.S. Appl. No. 10/601,956, Cherkasova et al.

U.S. Appl. No. 10/601,992, Cherkasova et al.

Cherkasova, L. et al., "Characterizing Locality, Evolution, and Life span of Accesses in Enterprise Media Server Workloads," NOSSDAV '02, May 12-14, 2002, 10 pages.

"Data center virtualization benefits", [Online] Retrieved Dec. 12, 2003 Retrieved from http://h71028.www7.hp.com/enterprise/cache -2 pages.

Dan, A. et al., "Buffering and Caching in Large-Scale Video Servers," IEEE 1995, pp. 217-224, Dec. 31.

Eager, D. et al., "Optimal and Efficient Merging Schedules for Video-on-Demand Servers," Proc. ACM Multimedia 1999, 4 pages, Dec. 31.

Kim, I. et al., "VBR Video Data Scheduling using Window-Based Prefetching," IEEE 1999, pp. 159-164 Dec. 31.

Ranjan, S. et al., "QoS-Driven Server Migration for Internet Data Centers," Proc. of IWQoS 2002, 10 pages, Dec. 31.

"HP Utility Data Center", [Online] Retrieved Dec. 12, 2003 Retrieved from http://h71028.www7.hp.com/enterprise/cache -2 pages.

"Data center virtualization overview", [Online] Retrieved Dec. 12, 2003 Retrieved from http://h71028.www7.hp.com/enterprise/cache -2 pages.

"Data center virtualization architecture", [Online] Retrieved Dec. 12, 2003 Retrieved from http://h71028.www7.hp.com/enterprise/cache -2 pages.

* cited by examiner

FIG. 6
OUTPUT OF MEDIA PROFILER: MEDIA SITE WORKLOAD PROFILE 203
| TIME STAMP | CONCURRENT SESSIONS | <56Kb/s | | 56-112Kb/s | | >112Kb/s | |
|---|---|---|---|---|---|---|---|
| | | DISK | MEMORY | DISK | MEMORY | DISK | MEMORY |
| ⋮ | ⋮ | ⋮ | ⋮ | ⋮ | ⋮ | ⋮ | ⋮ |
| $t_i-1$ | 100 | 2 | 0 | 5 | 2 | 85 | 6 |
| $t_i$ | 104 | 2 | 0 | 5 | 2 | 89 | 6 |
| $t_i+1$ | 103 | 1 | 0 | 5 | 2 | 89 | 6 |
| ⋮ | ⋮ | ⋮ | ⋮ | ⋮ | ⋮ | ⋮ | ⋮ |
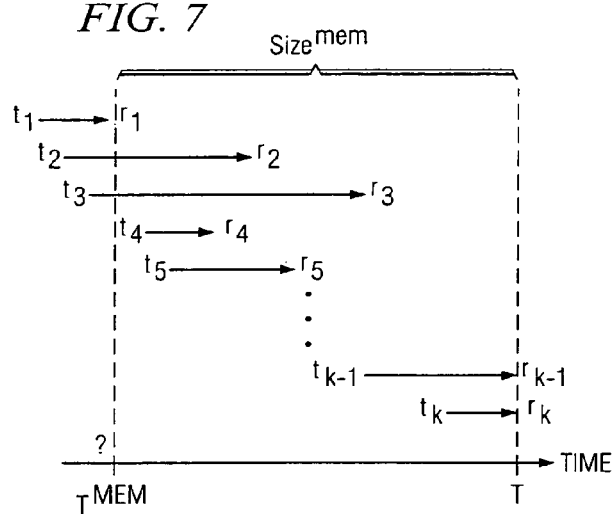
FIG. 7
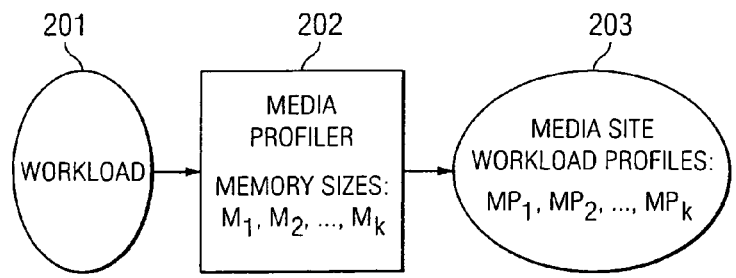
FIG. 8

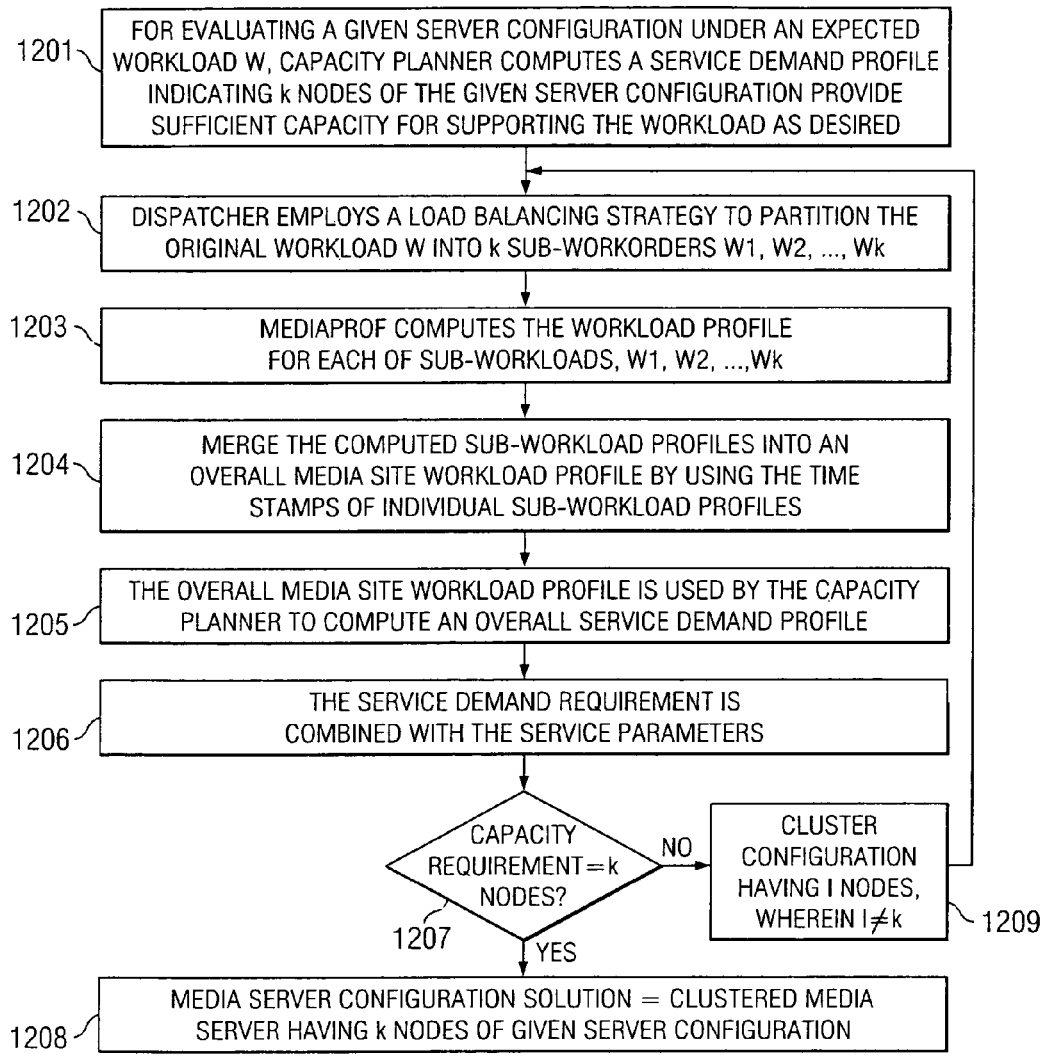

*FIG. 12*

1201 — FOR EVALUATING A GIVEN SERVER CONFIGURATION UNDER AN EXPECTED WORKLOAD W, CAPACITY PLANNER COMPUTES A SERVICE DEMAND PROFILE INDICATING k NODES OF THE GIVEN SERVER CONFIGURATION PROVIDE SUFFICIENT CAPACITY FOR SUPPORTING THE WORKLOAD AS DESIRED

1202 — DISPATCHER EMPLOYS A LOAD BALANCING STRATEGY TO PARTITION THE ORIGINAL WORKLOAD W INTO k SUB-WORKORDERS W1, W2, ..., Wk

1203 — MEDIAPROF COMPUTES THE WORKLOAD PROFILE FOR EACH OF SUB-WORKLOADS, W1, W2, ...,Wk

1204 — MERGE THE COMPUTED SUB-WORKLOAD PROFILES INTO AN OVERALL MEDIA SITE WORKLOAD PROFILE BY USING THE TIME STAMPS OF INDIVIDUAL SUB-WORKLOAD PROFILES

1205 — THE OVERALL MEDIA SITE WORKLOAD PROFILE IS USED BY THE CAPACITY PLANNER TO COMPUTE AN OVERALL SERVICE DEMAND PROFILE

1206 — THE SERVICE DEMAND REQUIREMENT IS COMBINED WITH THE SERVICE PARAMETERS

1207 — CAPACITY REQUIREMENT = k NODES?

NO → 1209 CLUSTER CONFIGURATION HAVING l NODES, WHEREIN l ≠ k

YES ↓

1208 — MEDIA SERVER CONFIGURATION SOLUTION = CLUSTERED MEDIA SERVER HAVING k NODES OF GIVEN SERVER CONFIGURATION

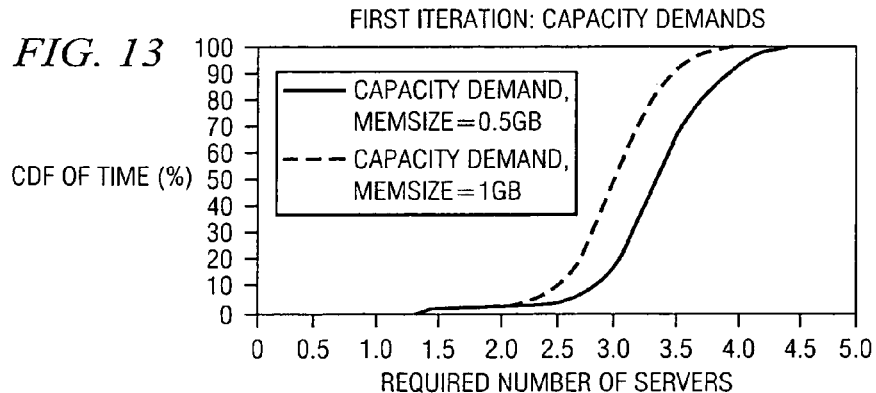

SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD

CROSS-REFERENCE TO RELATED APPLICATIONS

This application is related to the following co-pending and commonly assigned patent applications: 1) U.S. patent application Ser. No. 10/306,279 filed Nov. 27, 2002 entitled "SYSTEM AND METHOD FOR MEASURING THE CAPACITY OF A STREAMING MEDIA SERVER,", now U.S. Pat. No. 7,424,528, 2) U.S. patent application Ser. No. 10/601,956 filed Jun. 23, 2003 entitled "SYSTEM AND METHOD FOR MODELING THE MEMORY STATE OF A STREAMING MEDIA SERVER," U.S. Pat. No. 7,310,681, 3) U.S. patent application Ser. No. 10/601,992 filed Jun. 23, 2003 entitled "COST-AWARE ADMISSION CONTROL FOR STREAMING MEDIA SERVER,", now U.S. Pat. Nos. 7,797,439, and 4) patent application Ser. No. 10/660,978 filed Sep. 12, 2003 entitled "SYSTEM AND METHOD FOR EVALUATING A CAPACITY OF A STREAMING MEDIA SERVER FOR SUPPORTING A WORKLOAD,", now U.S. Pat. No. 7,610,381, the disclosures of which are hereby incorporated herein by reference.

FIELD OF THE INVENTION

The following description relates in general to evaluating a capacity of a streaming media server for supporting a workload, wherein the streaming media server is implemented as a cluster.

DESCRIPTION OF RELATED ART

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (e.g., a media server) to a client and begins playing on the client before fully downloaded.

Media servers are typically implemented for providing streaming media to clients. A "cluster" is often used to implement a media server. In general, a cluster is a group of nodes (e.g., servers and/or other resources) that appear to a user as a single system. For instance, a plurality of servers may be implemented as a cluster to form a single media server for serving streaming media files to requesting clients. While a plurality of different servers are used for servicing the clients' requests, to each client the cluster appears to be a single media server (i.e., it appears to the clients that they are accessing a single media server). Such cluster computing may be implemented to provide high availability (e.g., through redundancy provided by the plurality of nodes), parallel processing, and/or load balancing. Various load balancing strategies may be used for a cluster, including as examples a round-robin strategy or a "locality-aware" strategy, e.g., Locality-Aware Request Distribution ("LARD") strategy.

Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server, even a clustered media server, for supporting a given "workload" (i.e., a number of concurrent client accesses of streaming media from the media server). Streaming media service providers have traditionally had difficulty in evaluating whether a given media server configuration (e.g., a server implementation having a certain size of memory, certain disk configuration, certain number of nodes in a cluster, etc.) provides sufficient capacity for supporting the service providers' workload as desired. Thus, streaming media service providers have traditionally had difficulty in evaluating different media server configurations for capacity planning to, for example, determine the most cost-effective configuration that is capable of supporting the service providers' media service workload.

BRIEF SUMMARY OF THE INVENTION

According to at least one embodiment, a method comprises receiving, into a capacity planning system, workload information representing an expected workload of client accesses of streaming media files from a site. The method further comprises the capacity planning system determining, for at least one server configuration, how many servers of the at least one server configuration to be included at the site for supporting the expected workload in a desired manner.

According to at least one embodiment, a method comprises receiving, into a capacity planning tool, information about a first server configuration. The method further comprises receiving, into the capacity planning tool, workload information representing an expected workload of client accesses of streaming media files from a site. The capacity planning tool determines how many servers of the first server configuration to be included at the site for supporting the expected workload in a desired manner.

According to at least one embodiment, a system comprises means for receiving workload information representing an expected workload of client accesses of streaming media files from a site. The system further comprises means for determining an optimal number of servers of a given configuration type to be implemented at the site for supporting the expected workload.

According to at least one embodiment, a method comprises receiving workload information identifying an expected workload of client accesses of streaming media files from a server, and determining a service demand profile for at least one server configuration under evaluation. The method further comprises determining from the service demand profile how many of the first server configuration under evaluation are needed for supporting the expected workload in a desired manner.

According to at least one embodiment, a system comprises a media profiler operable to receive a client access log collected over a period of time for a service provider's site and generate a workload profile for a server configuration under consideration for supporting the service provider's site. The system further comprises a capacity planner operable to receive the generated workload profile for the server configuration under consideration and determine how many servers of the server configuration are needed to provide sufficient capacity for supporting the site's workload.

According to at least one embodiment, computer-executable software code stored to a computer-readable medium comprises code for receiving workload information representing an expected workload of client accesses of streaming media files from a site. The computer-executable software code further comprises code for determining how many nodes of a given configuration type to be implemented as a cluster at the site for supporting the expected workload in a desired manner.

BRIEF DESCRIPTION OF THE DRAWINGS

FIG. 6 shows another example of a workload profile that may be generated by a media profiler in accordance with one embodiment;

FIG. 7 shows an example of requests for file accesses that are made to a media server during an interval of time;

FIG. 8 shows an example embodiment wherein workload information is received by a media profiler, which produces a plurality of media workload profiles $MP_1, MP_2, \ldots, MP_k$ for server configurations having different memory sizes $M_1, M_2, \ldots, M_k$;

FIG. 12 shows an example operational flow for evaluating the capacity of a clustered media server in accordance with one embodiment;

FIG. 13 shows the computed Cumulative Density Function (CDF) of capacity requirements for processing a synthetic workload $W_{syn}$ on a media server $\hat{S}$ with two different memory sizes as a result of the first iteration of a capacity planning process in accordance with one embodiment;

DETAILED DESCRIPTION

Figure 1:
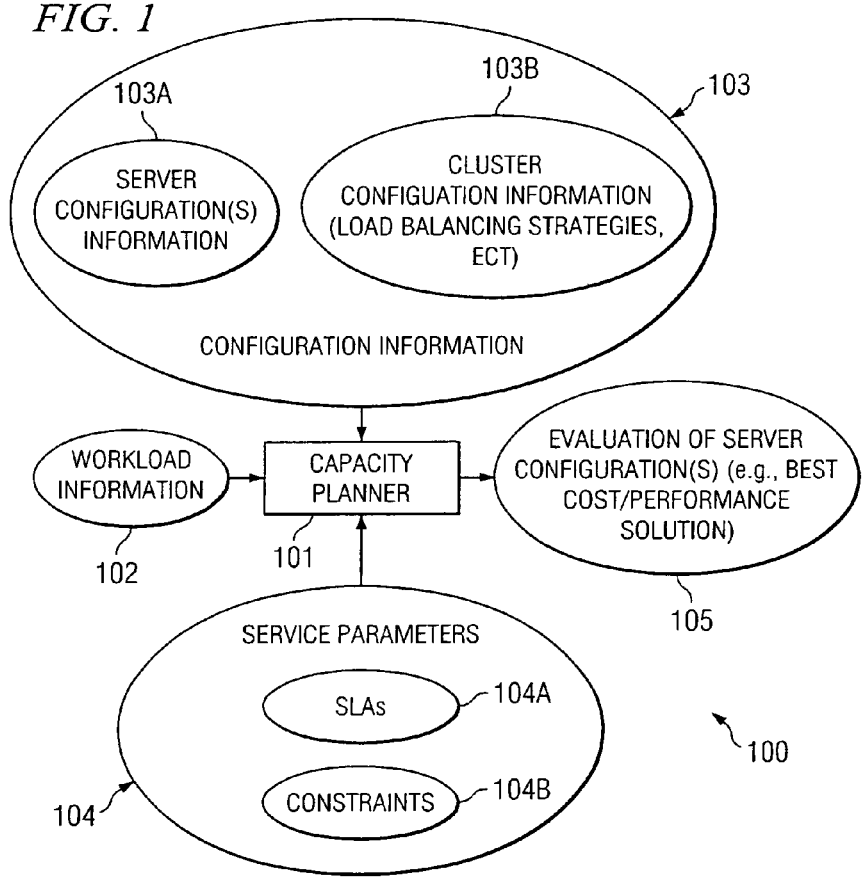
FIG. 1 shows a block diagram of an example embodiment of a capacity planning tool.

Various embodiments of a capacity planning tool (which may also be referred to herein as a "server configuration evaluator") are now described with reference to the above figures, wherein like reference numerals represent like parts throughout the several views. FIG. 1 shows a block diagram of an example embodiment of a capacity planning tool. As shown, system 100 includes capacity planner 101, which is capable of receiving input information regarding at least one server configuration and an expected (or "forecast") workload. Capacity planner 101 is further operable to make an evaluation of such server configuration(s) under the expected workload, as described further below.

In certain embodiments described below, capacity planner 101 is capable of determining how many servers of a particular configuration under consideration are needed for forming a cluster of such servers for supporting the expected workload in a desired manner. More specifically, for a given server (or "node") configuration, capacity planner 101 is operable to determine the number of such servers (or "nodes") that are needed for supporting the expected workload in a desired manner. For certain expected workloads, a single server may be capable of supporting such workloads in a desired manner. Thus, clustering of a plurality of such servers may be unnecessary for achieving the desired capacity. However, a single server configuration may not be capable of supporting certain other workloads (e.g., the workloads may overload the single server). That is, a site's expected workload may be too great to be adequately supported in the manner desired by the service provider by a single server. In the cases in which a single server is unable to support the expected workload in a desired manner, a plurality of such servers may be clustered together to increase the capacity of the resulting cluster. As described further below, in certain embodiments capacity planner 101 is operable to take into consideration one or more load balancing strategies (e.g., round-robin, LARD, etc.) that may be used by the cluster.

Thus, capacity planner 101 can aid a service provider in determining a proper media server configuration to be implemented for supporting its expected workload. For instance, in certain embodiments a service provider specifies a given server configuration and load balancing strategy desired to be utilized, and capacity planner 101 determines how many of such servers of the specified configuration type are to be clustered together for supporting the service provider's expected workload in a desired manner when the specified load balancing strategy is utilized for the cluster. Thus, the service provider can intelligently determine how many servers of the specified configuration type to implement in the media server cluster for supporting the service provider's site.

In certain embodiments, capacity planner 101 evaluates a plurality of different server configurations and/or a plurality of different load balancing strategies to determine various different solutions that are each capable of supporting the service provider's expected workload in a desired manner (e.g., in accordance with certain service parameters, as discussed further below). For instance, capacity planner 101 may determine that each of the following media server configurations are capable of supporting the service provider's expected workload in the manner desired by the service provider: 1) a cluster of 4 servers of configuration type A using load balancing strategy X; 2) a cluster of 5 servers of configuration type A using load balancing strategy Y; 3) a cluster of 7 servers of configuration type B using load balancing strategy X; 4) a cluster of 10 servers of configuration type B using load balancing strategy Y; etc. The service provider may then compare the monetary costs, as well as other characteristics, of each solution (i.e., each media server configuration), to identify an optimal solution for its site. In certain embodiments, capacity planner 101 includes monetary cost information for each server configuration such that it is capable of making this comparison for the service provider. In this manner, and as described further below, capacity planner 101 greatly aids a service provider in intelligently determining a media server configuration to be implemented for supporting the service provider's expected workload.

In the example of FIG. 1, workload information 102 is received by capacity planner 101. Such workload information may comprise information about a workload of client accesses to one or more streaming media files being served by a media server. In certain implementations the workload information may be actual past access logs collected by a service provider, or it may be an estimated workload that is expected. For instance, media service providers typically collect media server access logs, which reflect processed client requests and client activities at the site. A log of client accesses over a past period of say, 3 months to a year, may provide a representative "view" of the service provider's regular workload, and thus may be used as an "expected" workload for the service provider. From such a log of client accesses, a determination can be made as to the number of concurrent client accesses to a streaming media file from a media server at any given point in the time period for which client accesses were logged. As described further below in conjunction with FIG. 2, in certain embodiments such access log information may be processed to generate a workload profile for the service provider, and the generated workload profile may be used by capacity planner 101 in evaluating a server configuration under consideration.

Further, capacity planner 101 may receive configuration information 103, such as server configuration information 103A (which may be referred to herein as "system configuration information" or "node configuration information") and cluster configuration information 103B shown in the example of FIG. 1. Cluster configuration information 103B may include information about different configurations for clusters that may be used in implementing a clustered media server, such as different load balancing strategies (e.g., round-robin, LARD, etc.) that may be employed for a cluster. Server configuration information 103A may comprise information about one or more server (or "node") configurations, such as the respective memory size, disk configuration and speed, processor speed, bandwidth, etc. for a corresponding server configuration. In certain implementations, the server configuration information 103A may also include monetary cost information (or "price") of a corresponding server configuration. Such monetary cost information may be used by capacity planner 101 in certain implementations for evaluating server configurations to determine a most cost-effective media server configuration (e.g., a single server configuration or cluster of a plurality of server configurations) that is capable of supporting the received workload in a manner desired by the service provider (e.g., in accordance with defined service parameters, such as those discussed further below).

As described further below, server configuration information 103A may also include benchmark information, such as the benchmark information described in co-pending U.S. Patent Application Publication No. 2004/0103189, now U.S. Pat. No. 7,424,528, which discloses a set of benchmarks for measuring the basic capacities of streaming media systems. The benchmarks allow one to derive the scaling rules of server capacity for delivering media files which are: i) encoded at different bit rates, and ii) streamed from memory versus disk. As U.S. Patent Application Publication No. 2004/0103189 further describes, a "cost" function can be derived from the set of basic benchmark measurements. This cost function may provide a single value to reflect the combined resource requirement such as CPU, bandwidth, and memory to support a particular media stream depending on the stream bit rate and type of access (e.g., memory file access or disk file access).

Further, capacity planner 101 may receive service parameters 104, which may include service level agreements (SLAs) 104.sub.A and/or constraints 104.sub.B, as examples. Service parameters 104 define certain characteristics of the type of service desired to be provided by the service provider under the expected workload. For instance, SLAs $104_A$ may include information identifying at least one performance criteria for the service, such as the desired media server configuration is one capable of supporting the expected workload at least X % (e.g., 99%) of the time. For example, SLA $104_A$ may specify that when presented the expected workload, the desired server configuration is overloaded to the point that it is unable to support the number of concurrent streams that it is serving (thus degrading the quality of service of one or more of those streams) no more than 1% of the time. Constraints $104_B$ may include information restricting, for example, the amount of time that the desired media server configuration is at or near its capacity under the expected workload. For example, a constraint may be defined specifying that the media server configuration desired by the service provider is utilized under 70% of its capacity for at least 90% of the time under the expected workload. Such constraint may, for example, allow the service provider to define a certain amount of over-capacity into the desired server configuration to enable future growth of the workload to be supported by the server. The service parameters 104 may, in certain implementations, be variables that can be defined by a service provider.

Capacity planner 101 is operable to evaluate one or more configurations 103, such as may be identified by server configuration information 103A and/or cluster configuration information 103B, under the received workload 102, and capacity planner 101 outputs an evaluation 105 of such one or more media server configurations. More specifically, evaluation 105 may include an evaluation of the capacity of one or more media server configurations formed using the one or more server configurations under consideration for supporting the expected workload 102. For instance, such evaluation 105 may identify a plurality of different media server configurations that are each capable of supporting workload 102 in accordance with the defined service parameters 104. For example, suppose that server configuration information 103A includes information for two different server configuration types, A and B, and cluster configuration information 103B includes information for two different load balancing strategies, X and Y; in certain embodiments, capacity planner 101 outputs evaluation 105 identifying the following different media server configurations that are each capable of supporting a service provider's expected workload 102 in accordance with the defined service parameters 104: 1) a cluster of 4 servers of configuration type A using load balancing strategy X; 2) a cluster of 5 servers of configuration type A using load balancing strategy Y; 3) a cluster of 7 servers of configuration type B using load balancing strategy X; and 4) a cluster of 10 servers of configuration type B using load balancing strategy Y. Further, in certain implementations, evaluation 105 may provide a comparison of the capacities of the various different media server configurations for supporting the expected workload 102, as well as the monetary cost of each media server configuration. From this information, a service provider may make an informed decision regarding the best media server configuration to be implemented for supporting the service provider's future workload. For instance, the service provider may, in certain implementations, determine the most cost-effective media server configuration, which may be a single server of a particular configuration type or a cluster of servers of a particular configuration type that use a certain load balancing strategy for supporting the expected workload in a desired manner.

For evaluating the capacity of a server configuration under the expected workload, certain embodiments provided herein use a "cost" function for evaluating the amount of resources of the server configuration that are consumed under the workload. That is, in certain embodiments capacity planner 101 is operable to compute a "cost" in terms of server resources consumed for supporting the workload. This cost function, which is described further below in conjunction with the example of FIG. 2, may provide a single value to reflect the combined resource requirement such as CPU, bandwidth, and memory to support a particular media stream depending on the stream bit rate and type of access (e.g., memory file access or disk file access). In general, this cost function is used to compute the cost (in terms of resources consumed) of serving a stream (request) depending on its type: 1) its encoding bit rate, and 2) its access type (memory versus disk). Capacity planner 101 can evaluate the computed cost of a given server configuration to evaluate whether the server configuration can support the workload in accordance with the service parameters 104.

The ability to plan and operate at the most cost effective capacity provides a desirable competitive advantage for many streaming media service providers. Consider, for example, a scenario where a service provider, supporting a busy media site, faces a necessity to migrate the site to a new, more efficient infrastructure. For example, it may be determined that the service provider's current media server configuration is unable to adequately support the service provider's regular workload, and thus a new media server configuration is desired. The challenge becomes determining the optimal or most cost-effective infrastructure for the service provider to implement. On the one hand, the service provider typically desires to implement a media server configuration that is capable of supporting the service provider's workload (at least for a majority of the time) such that a desired quality of service is maintained for the streams that it serves. However, the service provider also typically desires to minimize the monetary cost of the media server configuration. Thus, the service provider typically does not wish to select a media server configuration that will be capable of supporting the service provider's workload at a cost of $X dollars, while a media server configuration that costs much less would be capable of supporting the service provider's workload just (or almost) as well. The service provider traditionally has no tool for evaluating the manner in which each of the media server configurations being considered would support the service provider's expected workload. Thus, the service provider traditionally makes a relatively uninformed decision regarding which media server configuration to implement for supporting the service provider's site.

Typically, the relationship between various media server configurations and their respective abilities to support a service provider's workload is not fully understood or appreciated by the service provider, thereby making the decision of selecting a media server configuration difficult. Accordingly, a capacity planning tool, such as capacity planner 101 of FIG. 1, that is capable of evaluating media server configurations for a workload and provide feedback regarding the capacity of such configurations for supporting the workload and/or identifying the most cost-effective configuration is a beneficial tool for service providers.

Figure 2:
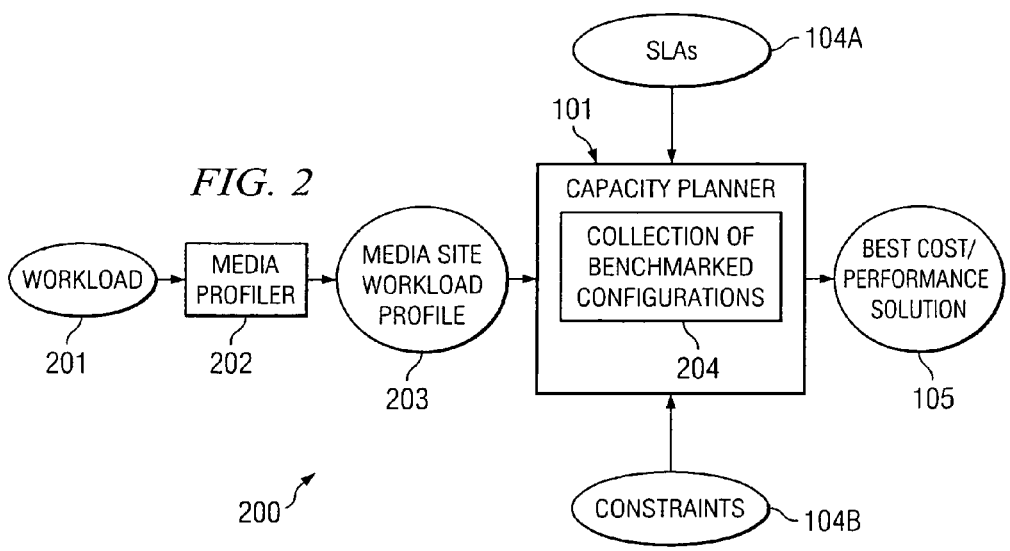
FIG. 2 shows a block diagram of another example embodiment of a capacity planning tool.

Turning to FIG. 2, a block diagram of another example embodiment of a capacity planning tool is shown. As with the example embodiment of FIG. 1, system 200 includes capacity planner 101, which may receive, as input, service parameters defining certain characteristics of the type of service desired to be provided by the service provider under the expected workload, such as SLAs $104_A$ and constraints $104_B$.

In the example of FIG. 2, a media profiler 202 (referred to herein as "MediaProf") is implemented. Such MediaProf 202 receives workload information 201 and generates a workload profile 203 for the service provider's workload. As mentioned above, media service providers typically collect media server access logs, which reflect processed client requests and client activities at the service provider's site. In the example of FIG. 2, workload 201 comprises such an access log (which may be from a single server or from a cluster of server's at the service provider's site, depending on the service provider's current media server configuration) for an elapsed period of say, 3 months to a year. The access log may include information for any suitable elapsed period of time that is sufficiently long to provide a representative "view" of the service provider's regular (or typical) workload.

MediaProf 202 receives this workload information (e.g., access log) 201 and processes such workload information 201 to generate a workload profile 203 for the service provider. Such workload profile 203 is then received by capacity planner 101 and used thereby for evaluating one or more server configurations under consideration. In certain implementations, MediaProf 202 processes the access log collected for a service provider's site to characterize the site's access profile and its system resource usage in both a quantitative and qualitative way in the workload profile 203. Examples of workload profile 203 that may be generated by MediaProf 202 according to certain implementations are described further below in conjunction with FIGS. 5 and 6. As described further with FIGS. 5 and 6, in certain embodiments workload profile 203 identifies the access types of requests (e.g., memory versus disk) in the workload for a given server configuration under consideration. Thus, media profiler 2020 may generate a different workload profile 203 for different server configurations (e.g., having different memory sizes) for the given workload 201.

In the example embodiment of FIG. 2, capacity planner 101 has the ability to measure and to compare the capacities of different media server configurations. More specifically, in this example embodiment capacity planner 101 uses a cost function for evaluating the capacities of various different server configurations under the workload. As mentioned above, a technique for measuring server capacity using a cost function is disclosed in co-pending U.S. Patent Application Publication No. 2004/0103189, now U.S. Pat. No. 7,424,528. Also, a technique for measuring server capacity using a cost function is described by L. Cherkasova and L. Staley in "Building a Performance Model of Streaming Media Applications in Utility Data Center Environment", *Proc. of ACM/IEEE Conference on Cluster Computing and the Grid* (*CCGrid*), May, 2003 (hereinafter referred to as "the L. Cherkasova Paper"), the disclosure of which is hereby incorporated herein by reference. The above references introduce a basic benchmark that can be used to establish the scaling rules for server capacity when multiple media streams are encoded at different bit rates. For instance, a basic benchmark may be executed for each of various different encoding bit rates for files stored at a media server.

A media server (which may be either a single server or a cluster of servers) may comprise streaming media files that are encoded for transmission at each of a plurality of different bit rates. For example, a first streaming media file, "File A," may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage of the media server and the media server may be able to serve the appropriate one of such files as a stream to a client. In this case, the different encoded files comprise substantially the same content (i.e., the content of File A), but are encoded for transmission at different bit rates, and thus the quality of each file may differ. A media server generally attempts to serve the most appropriate encoded file to a client based at least in part on the client's access speed to the client-server network. For example, suppose a first client has a 28 Kb/s speed connection to the communication network (e.g., the Internet), a second client has a 56 Kb/s speed connection to the communication network, and a media server comprises File $A_1$ encoded at 28 Kb/s and File $A_2$ encoded at 56 Kb/s stored thereto; when the first client requests the content of File A, the media server typically attempts to serve File $A_1$ to this first client (as File $A_1$ is the highest-quality encoded file supportable by the first client's connection speed), and when the second client requests the content of File A, the media server typically attempts to serve File $A_2$ to this second client (as File $A_2$ is the highest-quality encoded file supportable by the second client's connection speed).

As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

As shown in the example of FIG. 2, capacity planner 101 may have stored thereto (e.g., to a data storage device, such as random access memory (RAM), hard disk, optical disk drive, etc., which is communicatively accessible by capacity planner 101) server configuration information 204, such as server configuration information 103A in the example of FIG. 1. Although not specifically shown in FIG. 2, capacity planner 101 may also include cluster configuration information 103B of FIG. 1. In this example, server configuration information 204 includes benchmark information for various different server configurations, such as the benchmark information described in co-pending U.S. Publication No. 2004/0103189, now U.S. Pat. No. 7,424,528. An objective of the basic benchmark according to one embodiment is to define how many concurrent streams of the same bit rate can be supported by the corresponding server configuration without degrading the quality of any streams.

In accordance with one embodiment, the basic benchmark comprises two types of benchmarks:
1) Single File Benchmark measuring a media server capacity when all the clients in the test workload are accessing the same file, and
2) Unique Files Benchmark measuring a media server capacity when each client in the test workload is accessing a different file.

Each of these benchmarks have a set of sub-benchmarks with media content encoded at a different bit rate. In one performance study that we have conducted, the following six bit rates that represent the typical Internet audience were used: 28 Kb/s, 56 Kb/s, 112 Kb/s, 256 Kb/s, 350 Kb/s, and 500 Kb/s. Of course, the set of benchmarked encoding bit rates can be customized according to a targeted workload profile, and thus other encoding bit rates instead of or in addition to those of our performance study may be used in various embodiments.

Thus, a Single File Benchmark (SFB) may be executed for each of various different encoding bit rates for files stored at a server configuration under evaluation. The SFB measures the server capacity when all of the clients in the test are accessing the same file. That is, the result of the SFB for a particular encoding bit rate defines the maximum number of concurrent streams of a single file encoded at that particular bit rate that the corresponding server configuration can support. Example techniques for executing SFBs for a media server are described further in co-pending U.S. Patent Application Publication No. 2004/0103189 now U.S. Pat. No. 7,424,528. In this example embodiment of FIG. 2, an SFB is determined for each of various different server configurations, and such SFB determined for each server configuration is included in the collection of benchmarks 204.

Similarly, a Unique Files Benchmark (UFB) may be executed for each of various different encoding bit rates for files stored at a server configuration under evaluation. The UFB measures the server capacity when all of the clients in the test are accessing different files. That is, the result of a UFB for a particular encoding bit rate defines the maximum number of concurrent streams, each of different files that are encoded at the particular bit rate, that the corresponding server configuration can support. Example techniques for executing UFBs for a media server are described further in co-pending U.S. Patent Application Publication No. 2004/0103189, now U.S. Pat. No. 7,424,528. In an example embodiment of FIG. 2, a UFB is determined for each of various different server configurations, and such UFB determined for each server configuration is included in the collection of benchmarks 204.

When all of a media server's clients are accessing a single file (as measured by the SFB), the media server is capable of serving the currently streamed bytes of the file from memory. However, when all of its clients are accessing a different file (as measured by the UFB), the media server serves each file from disk. Thus, the SFB is essentially a best-case scenario benchmark, whereas the UFB is essentially a worst-case scenario benchmark for a corresponding server configuration under consideration.

Using an experimental testbed with standard components available in a Utility Data Center environment and proposed set of basic benchmarks, the capacity and scaling rules of a media server running RealServer 8.0 from RealNetworks was measured in the L. Cherkasova Paper. The measurement results reported in the L. Cherkasova Paper show that these scaling rules are non-trivial. For example, the difference between the highest and lowest bit rate of media streams used in those experiments was 18 times. However, the difference in maximum number of concurrent streams a server is capable of supporting for corresponding bit rates is only around 9 times for an SFB, and 10 times for a UFB. Modem media servers, such as RealServer 8.0, rely on the native operating system's file buffer cache support to achieve higher application throughput when accessed files are streamed from memory. The measurements indicate that media server performance is 2.5-3 times higher under the SFB than under the UFB. This quantifies the performance benefits for multimedia applications when media streams are delivered from memory versus from disk.

Capacity planner 101 uses the benchmarks for the various different server configurations to evaluate those server configurations under the received workload information (e.g., the workload profile 203). For evaluating the capacity of a server configuration under the expected workload, certain embodiments of a capacity planner use a "cost" function for evaluating the amount of resources of the corresponding server configuration under consideration that are consumed under the workload. As described in co-pending U.S. Patent Application Publication No. 2004/0103189, now U.S. Pat. No. 7,424,528 and in the L. Cherkasova Paper, a set of basic benchmark measurements for a server configuration may be used to derive a cost function that defines a fraction of system resources of such media server configuration that are needed to support a particular media stream depending on the stream bit rate and type of access (memory file access or disk file access), including the following costs;

A)

$$cost_{X_i}^{disk} - $$

a value of cost function for a stream with disk access to a file encoded at $X_i$ Kb/s. If we define the server configuration capacity being equal to 1, the cost function is computed as $$cost_{X_i}^{disk} = 1 / N_{X_i}^{Unique}, \text{ where } N_{X_i}^{Unique}$$

is the maximum measured server capacity in concurrent streams under the UFB of the corresponding server configuration under consideration for a file encoded at $X_i$ Kb/s; and

B)

$$3 \; cost_{X_i}^{memory} - $$

a value of cost function for a stream with memory access to a file encoded at $X_i$ Kb/s. Let $$N_{X_i}^{Single}$$

be the maximum measured server capicty in a concurrent streams under the SFB of the corresponding server configuration under consideration for a file encoded at $X_i$ Kb/s, then the cost function is computed as $$cost_{X_i}^{memory} = (N_{X_i}^{Unique} - 1) / (N_{X_i}^{Unique} \times (N_{X_i}^{Single} - 1)).$$

Let W be the current workload processed by a media server, where
a) $X_w = X_1, \ldots X_{k_w}$ is a set of distinct encoding bit rates of the files appearing in $W (X_w \subseteq X)$;
b)

$$N_{X_{W_i}}^{memory}$$

is a number of streams having a memory access type for a subset of files encoded at $X_{W_i}$ Kb/s; and
c)

$$N_{X_{W_i}}^{disk}$$

is a number of streams having a disk access type for a subset of files encoded at $X_{W_i}$ Kb/s.

Then, the service demand, "Demand," to a media server under workload W can be computed by the following capacity equation:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk} \qquad (1)$$

If Demand≦1 then a single-server configuration of the media server operates within its capacity, and the difference 1−Demand defines the amount of available server capacity. On the other hand, if Demand>1 then the single-server configuration of the media server is overloaded and its capacity is exceeded. For example, when the computed service demand is Demand=4.5, this indicates that the considered workload (media traffic) requires 5 nodes (of the corresponding server configuration) to be supported in the desired manner.

As described further below, in certain embodiments, an iterative approach is used by capacity planner 101 for determining media server configuration(s) that are capable of supporting the workload in a desired manner. For instance, capacity planner 101 may first use the benchmarks (SFB and UFB) and cost function for a given server configuration (i.e., a server having a particular size memory, etc.) to compute the Demand for such server configuration (using the corresponding benchmarks and cost function for this server configuration). If the Demand indicates that more than one of the servers of this configuration type is required for supporting the expected workload, capacity planner 101 then re-evaluates the expected workload for a clustered media server configuration having the number of servers indicated by the Demand. For instance, if when evaluating the capacity of a single server of a particular configuration type under consideration the Demand=4.5 (indicating that a cluster of 5 nodes of such server configuration type under consideration is needed for supporting the expected workload), capacity planner 101 re-evaluates the capacity of a clustered media server having the resources (e.g., amount of memory, etc.) of 5 of the servers of the configuration type under consideration. Capacity planner 101 then determines the media site workload profile 203 for such a clustered media server (because the workload profile 203 for the clustered media server may differ from the workload profile 203 initially determined for the single server configuration, e.g., because of the increased memory resources in the cluster certain accesses determined for the single server configuration as being disk accesses may now be memory accesses), and capacity planner 101 uses such determined workload profile 203 for the media cluster to compute the Demand. If the Demand computed for the clustered media server configuration again indicates that 5 servers of the configuration type under consideration are needed, capacity planner 101 concludes that such a cluster of 5 nodes is the proper solution for this configuration type for supporting the expected workload. That is, the capacity planner verifies that a cluster of 5 nodes of this configuration type are indeed needed for supporting the workload in the manner desired by the service provider. However, if the Demand for the clustered media server configuration indicates that a different number of servers (i.e., fewer or more than 5 servers in this example) of the configuration type under consideration are needed, capacity planner 101 again re-evaluates the capacity for supporting the expected workload of a clustered media server having the resources (e.g., amount of memory, etc.) of the different number of servers. For instance, if the Demand for the clustered media server configuration indicates that 4, rather than 5, servers of the configuration type under consideration are needed, the capacity planner determines the media site workload profile 203 for such a clustered media server having 4 nodes, and capacity planner 101 uses such determined workload profile 203 for the media cluster to compute the Demand for the 4-node cluster. This iterative operation may continue until capacity planner 101 verifies that a particular media server configuration (e.g., a cluster of a given number of nodes) provides sufficient capacity for supporting the expected workload in the manner desired by the service provider (e.g., in accordance with the service parameters 104). This iterative technique is described further below in connection with FIGS. 10A-15B.

In certain embodiments, capacity planner 101 may determine the Demand for various different media server configurations. For instance, using a media site traffic profile 203, capacity planner 101 can compute the Demand the site needs to support, and then compare the computed results. For example, for a server configuration of type 1 and the corresponding cost functions, the computed service demand is Demand=1.3, i.e. the considered media traffic requires more than 1 node (e.g., 2 nodes) of type 1 for its support, and for another server configuration of type 2 and its corresponding cost functions the computed service demand is Demand=0.8, i.e. 1 node of type 2 can support the media site traffic. Thus, capacity planner 101 can, in certain embodiments, determine for each of various different server (or "node") configuration types whether a single one of such servers or a cluster of such servers is needed for supporting the expected workload in the manner desired by the service provider (e.g., in compliance with the specified service parameters 104).

The above-described cost function uses a single value to reflect the combined resource requirement such as CPU, bandwidth and memory to support a particular media stream depending on the stream bit rate and type of the file access (memory or disk access). The proposed framework provides a convenient mapping of a service demand (client requests) into the corresponding system resource requirements.

As mentioned with FIG. 2, a workload profile 203 that is based on the past workload history (e.g., access log) 201 of a service provider, may be generated by MediaProf 202 and used by capacity planner 101 in evaluating the capacity of one or more server configurations for supporting the service provider's workload. While it may be useful to understand how much traffic is serviced by the site in a particular time interval (e.g., per hour), this knowledge does not translate directly into capacity requirements for a proper media server configuration. For properly evaluating a media server configuration's capacity for supporting a workload, information concerning the number of simultaneous (concurrent) connections and the corresponding peak bandwidth requirements may be used by capacity planner 101.

Figure 3A:
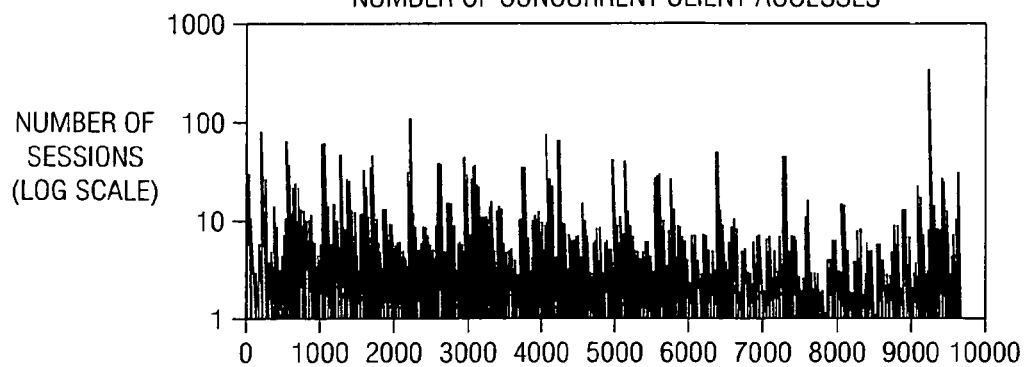
FIGS. 3A-3B show graphs illustrating the number of concurrent client sessions and the maximum bandwidth requirements for an example media site over a 1 year period of time.
Figure 3B:
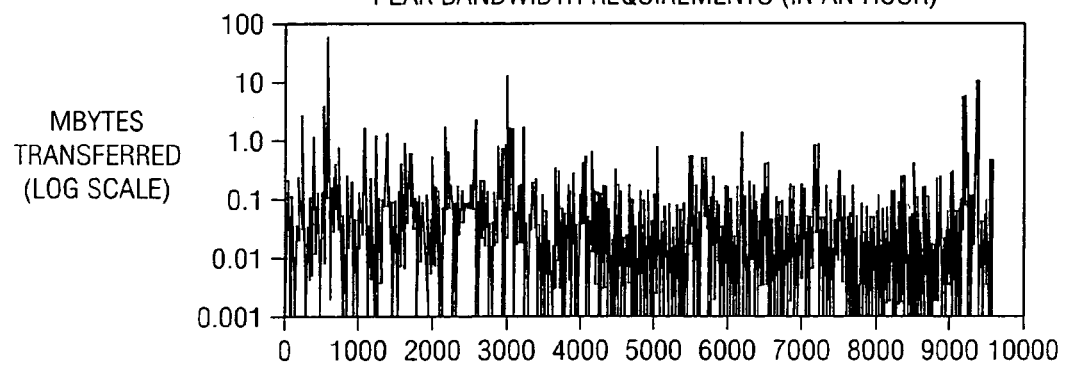

Access information reflected in access logs from an example media server supporting a Media Site "A" are now described as an example of access patterns that may occur at a service provider's site. This example access log is described further below in conjunction with FIGS. 3A-3B and 4A-4B. FIGS. 3A-3B show graphs illustrating the number of concurrent client sessions and the maximum bandwidth requirements to Media Site A over the considered workload duration (e.g., a 1 year period of time is assumed in this example). (Note that the Y axes use a logscale for both FIGS. 3A and 3B). These numbers are typically significantly lower than the corresponding numbers of aggregate traffic per hour.

Figure 4A:
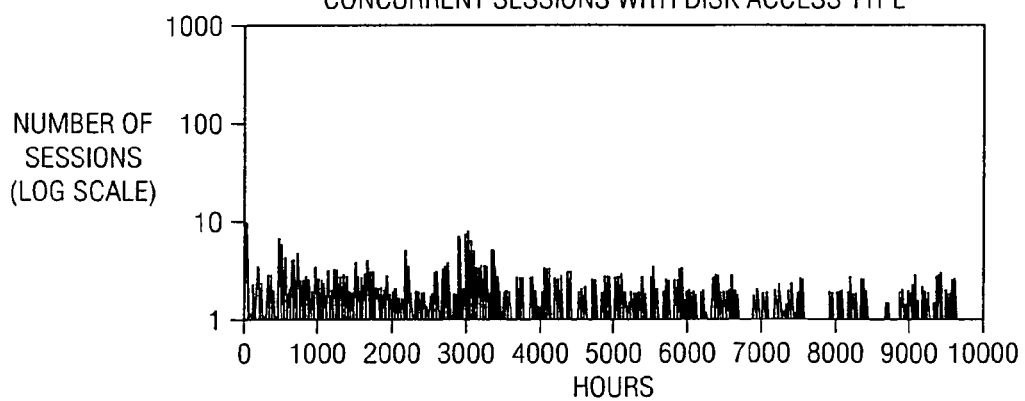
FIGS. 4A-4B show graphs illustrating the classification of client requests of the example media site of FIGS. 3A-3B into disk accesses (FIG. 4A) and memory accesses (FIG. 4B)
Figures 4B, 5:
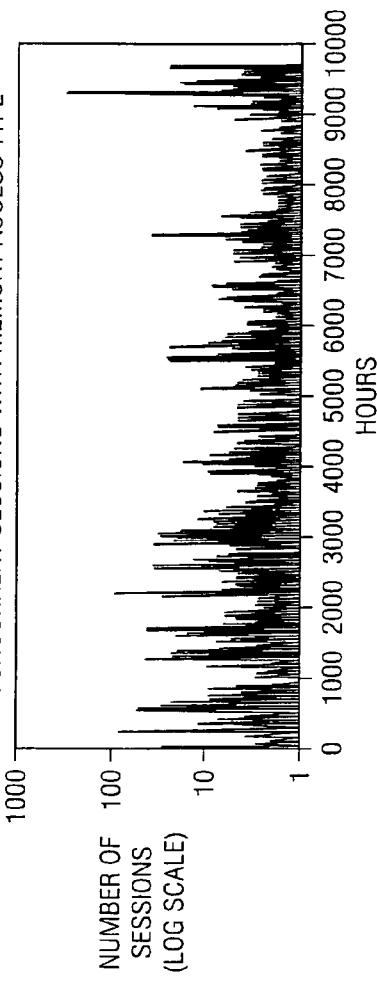
FIG. 5 shows one example of a workload profile that may be generated by a media profiler in accordance with one embodiment.

FIGS. 4A-4B show graphs illustrating the classification of client requests of the example Media Site A into disk accesses (FIG. 4A) and memory accesses (FIG. 4B) for client requests with encoding bit rates of 112-256 Kb/s, and a memory size of 1 GB (in this regard "memory size" means an estimate of what the server may use for file buffer cache). The results show that very large fraction of requests in this bit rate group can be served from memory. In particular, practically all the traffic bursts (or "spikes") can be served from memory as FIG. 4B shows. Since a media server capacity is typically 3-5 times higher when media streams are delivered from memory versus from disk, such a qualitative media traffic classification and analysis will directly translate in significant configuration savings.

Since the amount of system resources needed to support a particular client request depends on the file encoding bit rate as well as the access type of the corresponding request, (i.e. different requests have a different resource "cost" as described above), MediaProf 202 provides a corresponding classification of simultaneous connections in the generated workload profile 203. FIG. 5 shows a first example workload profile 203 that may be generated by certain embodiments of MediaProf 202. As shown, the example workload profile 203 of FIG. 5 includes various points in time for which access information was collected in the access log of workload 201, such as time T1. For each time point, the number of concurrent connections is identified. More specifically, the number of concurrent connections are categorized into corresponding encoding bit rates for the streaming media files accessed thereby. Further, the number of concurrent connections in each encoding bit rate category is further categorized into sub-categories of either memory or disk depending on whether the access was a memory access or a disk access. That is, MediaProf 202 may model whether a request in the workload can be serviced from memory or from disk for a given server configuration (e.g., a given memory size). For instance, the memory modeling technique disclosed in co-pending and commonly assigned U.S. Pat. No. 7,310,681 may be used in certain embodiments. In certain implementations, MediaProf 202 may build different profiles for different memory sizes (e.g., different profiles 203 are constructed for different media server configurations that have different memory sizes). Note that a memory access does not assume or require that the whole file resides in memory. For example, if there is a sequence of accesses to the same file issued closely to each other on a time scale, then the first access may read a file from disk, while the subsequent requests may be accessing the corresponding file prefix from memory. A technique that may be used by MediaProf 202 in determining whether an access is from memory or from disk is described further below in conjunction with FIG. 7.

In the example workload profile of FIG. 5, 30 concurrent connections (or client accesses) are in progress at time $T_1$ for the media site under consideration. The 30 concurrent connections are categorized into 3 accesses of media file(s) encoded at 28 Kb/s, 2 accesses of media file(s) encoded at 56 Kb/s, 3 accesses of media file(s) encoded at 112 Kb/s, 7 accesses of media file(s) encoded at 256 Kb/s, 5 accesses of media file(s) encoded at 350 Kb/s, and 10 accesses of media file(s) encoded at 500 Kb/s. Again, embodiments are not limited to the six encoding bit rate categories of the example of FIG. 5, but rather other encoding bit rates may be used instead of or in addition to those of FIG. 5 (e.g., as may be tailored for the service provider's site/workload). Further, the 3 accesses of media file(s) encoded at 28 Kb/s are further sub-categorized into 2 memory accesses and 1 disk access. The 2 accesses of media file(s) encoded at 56 Kb/s are further sub-categorized into 0 memory accesses and 2 disk accesses. The 3 accesses of media file(s) encoded at 112 Kb/s are further sub-categorized into 3 memory accesses and 0 disk accesses. The 7 accesses of media file(s) encoded at 256 Kb/s are further sub-categorized into 6 memory accesses and 1 disk access. The 5 accesses of media file(s) encoded at 350 Kb/s are further sub-categorized into 5 memory accesses and 0 disk accesses, and the 10 accesses of media file(s) encoded at 500 Kb/s are further sub-categorized into 8 memory accesses and 2 disk accesses.

Another example workload profile 203 that may be generated by certain embodiments of MediaProf 202 is shown in FIG. 6. As shown, the example workload profile 203 of FIG. 6 includes various points in time for which access information was collected in the access log of workload 201, such as timestamps $t_i-1$, $t_i$, and $t_i+1$. In this example, the timestamps show when the media server state changes, e.g., i) the media server accepts a new client request (or multiple new requests) or ii) some active media sessions are terminated by the clients. For each timestamp, the number of concurrent connections is identified. In the example of FIG. 6, there are 100 concurrent connections at timestamp $t_i-1$, 104 concurrent connections at timestamp $t_i$, and 103 concurrent connections at timestamp $t_i+1$. As with the example of FIG. 5, the number of concurrent connections are categorized into corresponding encoding bit rates for the streaming media files accessed thereby. In the example of FIG. 6, the number of the concurrent connections at any given timestamp are categorized into those connections that are accessing streaming media files encoded at less than 56 Kb/s, those that are accessing streaming media files encoded at a rate from 56 Kb/s to 112 Kb/s, and those that are accessing streaming media files encoded at greater than 112 Kb/s.

For each of these categories, the connections are further categorized into sub-categories of either memory or disk depending on whether the access was a memory access or a disk access. As described above, MediaProf 202 may model whether a request in the workload can be serviced from memory or from disk for a given server configuration (e.g., a given memory size), such as with the memory modeling technique disclosed in co-pending and commonly assigned U.S. Pat. No. 7,310,681. A technique that may be used by MediaProf 202 in determining whether an access is from memory or from disk is described further below in conjunction with FIG. 7.

Turning to FIG. 7, an example technique for MediaProf 202 determining an access type (i.e., whether memory or disk access) is now described. Let $Size^{mem}$ be the size of memory in bytes of a server configuration under consideration. For each request r in the media server access log of workload 201, information is included about the media file requested by r, the duration of r in seconds, the encoding bit rate of the media file requested by r, the time t when a stream corresponding to request r is started (which is reflected by r(t) herein), and the time when a stream initiated by request r is terminated.

Let $r_1(t_1)$, $r_2(t_2)$, . . . , $r_k(t_k)$ be a recorded sequence of requests to a media server. Given the current time T and request r(T) to media file f, MediaProf 202 may compute some past time $T^{mem}$ such that the sum of the bytes stored in memory between $T^{mem}$ and T is equal to $Size^{mem}$. Accordingly, the files' segments streamed by the media server between times $T^{mem}$ and T will be in memory at time T. In this way, MediaProf 202 can identify whether request r will stream file f (or some portion of it) from memory for a given server configuration under consideration.

In the specific example shown in FIG. 7, requests for file accesses that are made to a media server during the interval of time $t_1$ through time T is shown, wherein the interval from time $T^{mem}$ through time T can be determined that comprises the segments of accessed files that are currently stored to the media server's memory, which has size $Size^{mem}$. More specifically, accesses $r_1$, $r_2$, . . . $r_{k-1}$, $r_k$ are made during the time interval from time $t_1$ through the current time T.

As described further below, when a clustered media server configuration is considered, a dispatcher determines the requests of workload 201 that will be directed to each server of the cluster (in accordance with a load balancing strategy employed by the cluster), and considering memory size, $Size^{mem}$, of each server of the cluster, a determination is made whether each access is a memory type or a disk type. That is, the memory of each server in the cluster may be modeled in the manner described in connection with FIG. 7 to determine the corresponding access types (memory versus disk) for the requests of workload 201 that are serviced by each server of the cluster. As shown in the example of FIG. 7, the total size of the segments accessed is greater than the total size, Size$^{mem}$, of the media server's memory. Thus, depending on the type of memory management scheme implemented for the memory, some of the accessed segments are evicted from the memory. That is, not all of the accessed segments can be stored to memory because the segments' total size is greater than size Size$^{mem}$ of memory of the server configuration under consideration. Typically, a Least Recently Used (LRU) scheme is implemented for a media server, wherein the most recently accessed segments are stored to memory and the oldest (or least recently accessed) segments are evicted to make room for more recently accessed segments to be stored in memory. To determine the current contents of memory at time T, the time interval from time T$^{mem}$ to the time T in which unique file segments that have a size totaling size Size$^{mem}$ is determined by MediaProf 202 from the workload information 201.

Co-pending U.S. Pat. No. 7,310,681, further describes an example technique for modeling the memory state of a streaming media server, and such memory modeling technique may be employed by MediaProf 202 in certain embodiments for efficiently determining the memory state of a server configuration that is under consideration. That is, MediaProf 202 may use such memory modeling technique for modeling accesses of the workload 201 for a media server configuration under consideration to generate a workload profile 203, such as the example workload profile of FIG. 5 or FIG. 6.

In certain implementations, MediaProf 202 may build different profiles for different memory sizes (e.g., different profiles 203 are constructed for different server configurations that have different memory sizes). FIG. 8 shows an example embodiment wherein workload 201 is received by MediaProf 202, and MediaProf 202 produces a plurality of media workload profiles (203) MP$_1$, MP$_2$, . . . , MP$_k$ for specified memory sizes M$_1$, M$_2$, . . . , M$_k$. For instance, a plurality of memory sizes M$_1$, M$_2$, . . . , M$_k$ may be specified to MediaProf 202 (e.g., either pre-defined, specified by user-input, specified by capacity planner 101, etc.), and using the workload 201, MediaProf 202 generates the various different media workload profiles MP$_1$, MP$_2$, . . . , MP$_k$ corresponding to the memory sizes. In this way, MediaProf 202 allows evaluation of performance benefits of systems with different memory sizes when processing a particular workload.

In the example embodiment of FIG. 2, capacity planner 101 has a collection of benchmarked configurations 204 with the corresponding cost functions for different types of requests (i.e., requests serviced by memory versus requests serviced by disk). Capacity planner 101 receives the media site workload profile 203 (for a particular memory size) and using the cost functions of a particular media server configuration computes a corresponding service demand profile over time according to formula (1) above. In certain embodiments, the service demand profile is computed for different memory sizes and different benchmarked configurations to enable capacity planner 101 to evaluate the capacity of a plurality of different media server configurations for supporting the expected workload. An example of such a service demand profile is described further below in conjunction with FIGS. 9A-9B.

Figure 9A:
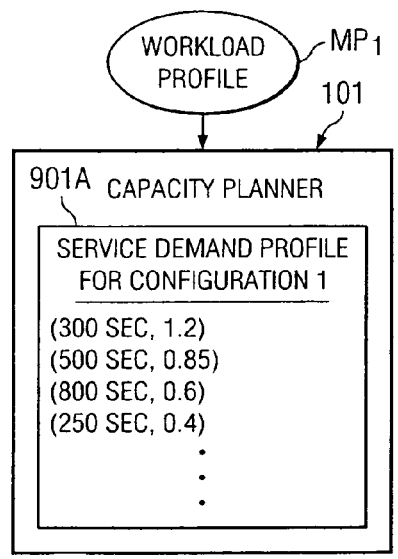
FIGS. 9A-9B show example service demand profiles that may be computed by a capacity planner from a received workload profile in accordance with one embodiment.
Figure 9B:
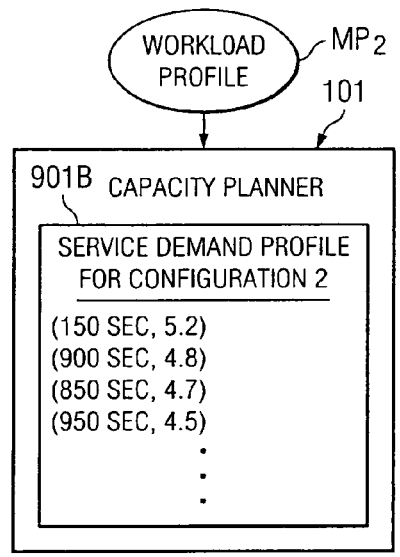

FIGS. 9A and 9B show example service demand profiles 901A and 901B that are generated by capacity planner 101 from received workload profiles 203. The workload profile 203 of FIG. 9A corresponds to a first workload profile (e.g., MP$_1$) for a first media server configuration (e.g., one having memory size M$_1$), and the workload profile 203 of FIG. 9B corresponds to a second workload profile (e.g., MP$_2$) for a second media server configuration (e.g., one having memory size M$_2$).

In the example of FIG. 9A, service demand profile 901A is a list of pairs. The first element of each pair represents a time duration (e.g. 300 seconds in the first pair of example service demand profile 901A). The second element of each pair reflects the service demand (or resource "cost") computed by capacity planner 101 for the corresponding time duration for a media server configuration under consideration (such as media server "configuration 1" in the example of FIG. 9A). In the example service demand profile 901, the first pair has a service demand of 1.2 for 300 seconds, the second pair provides that a service demand 0.85 was encountered for 500 seconds, and so on. A service demand greater than 1 (e.g., 1.2 for the first pair of service demand profile 901A) means that more than 1 of the server configurations under consideration were required for supporting the workload for a corresponding amount of time (e.g., at least 2 of the "configuration 1" servers are needed for supporting 300 seconds of the received workload 203 in the example of the first pair of the service demand profile 901A of FIG. 9A). In other words, the server configuration under consideration was overloaded for the corresponding period of time for which the capacity planner computes that the service demand in supporting workload 203 is greater than 1. The second pair of service demand profile 901A, (300 sec, 0.6), identifies that for 300 sec of the received workload 203, one server having the "configuration 1" under consideration is capable of supporting such workload, and the server under consideration is utilized during this time at 60% capacity.

In the example of FIG. 9B, service demand profile 901B is also a list of pairs, wherein the first element of each pair represents a time duration (e.g. 300 seconds in the first pair of example service demand profile 901A). The second element of each pair reflects the service demand (or resource "cost") computed by capacity planner 101 for the corresponding time duration for a media server configuration under consideration (such as media server "configuration 1" in the example of FIG. 9A). In the example service demand profile 901, the first pair has a service demand of 1.2 for 300 seconds, the second pair provides that a service demand 0.85 was encountered for 500 seconds, and so on. A service demand greater than 1 (e.g., 1.2 for the first pair of service demand profile 901A) means that more than 1 of the server configurations under consideration were required for supporting the workload for a corresponding amount of time (e.g., at least 2 of the "configuration 1" servers are needed for supporting 300 seconds of the received workload 203 in the example of the first pair of the service demand profile 901A of FIG. 9A). In other words, the server configuration under consideration was overloaded for the corresponding period of time for which the capacity planner computes that the service demand in supporting workload 203 is greater than 1. The second pair of service demand profile 901A, (300 sec, 0.6), identifies that for 300 sec of the received workload 203, one server having the "configuration 1" under consideration is capable of supporting such workload, and the server under consideration is utilized during this time at 60% capacity.

The service demand profile may be ordered by the service demand information (i.e., the second element of the pairs in the example of FIG. 9) from greatest service demand to least service demand. In this case, the top pairs in the service demand profile represent the peak load demands for the considered media server configuration under the received workload 203, as well as the corresponding time duration for these peak loads over time. Since workload measurements of existing media services indicate that client demands are highly variable (the "peak-to-mean" ratio may be an order of magnitude), it might not be economical to over-provision the future system using the past "peak" demand. That is, a media server configuration that fails to support the workload for a relatively small period of time (e.g., during "peak" demands or "bursts" of client accesses) may still be a suitable and/or most cost-effective configuration for a service provider to implement. As described above, a service provider can specify service parameters 104, such as SLAs 104$_A$ and/or constraints 104$_B$, which may be used by capacity planner 101 in evaluating the service demand profile 901 to determine whether the media server configuration under consideration is capable of supporting the expected workload in accordance with the specified service parameters 104. For example, an SLA 104$_A$ may be defined by a service provider to specify that a server configuration is desired that is capable of supporting the expected workload at least 99% of the time. Using the computed service demand profile 901, the capacity planner 101 may determine the maximum load requirements corresponding to the 99-th percentile of all the service demands for a media server configuration under consideration over time (under the expected workload). This service demand is denoted herein as Demand$_{SLA}$.

Additionally, in some instances, a service provider may wish to obtain a media server configuration with planned "spare" capacity for future growth, such as may be specified as constraints 104$_B$. For instance, constraints 104B may specify that a media server configuration is desired that is utilized under 70% of its available capacity for at least 90% of the time in supporting the workload 203. Thus, using the computed service demand profile 901, the capacity planner finds the maximum load requirements corresponding to the 90-th percentile of all the service demands for a media server configuration under consideration over time (under the expected workload 203). For example, if the service demand corresponding to 90-th percentile is 3.5, then the requirements to configuration utilized under 70% of its available capacity will be 3.5/0.7=5 (i.e., 5 nodes of the server configuration under consideration should be used to form a clustered media server that satisfies this service demand). This service demand is denoted herein as Demand$_{Constraints}$.

In this example, capacity planner 101 may determine a desirable performance requirements as Demand$_{overall}$=max (Demand$_{SLA}$,Demand$_{Constraints}$) rounded up to the closest integer. In some instances, there may be multiple media server configurations satisfying the specified performance requirements. Taking into consideration the monetary price information of the corresponding configurations, the best cost/performance solution can be determined by capacity planner 101.

Figure 10A:
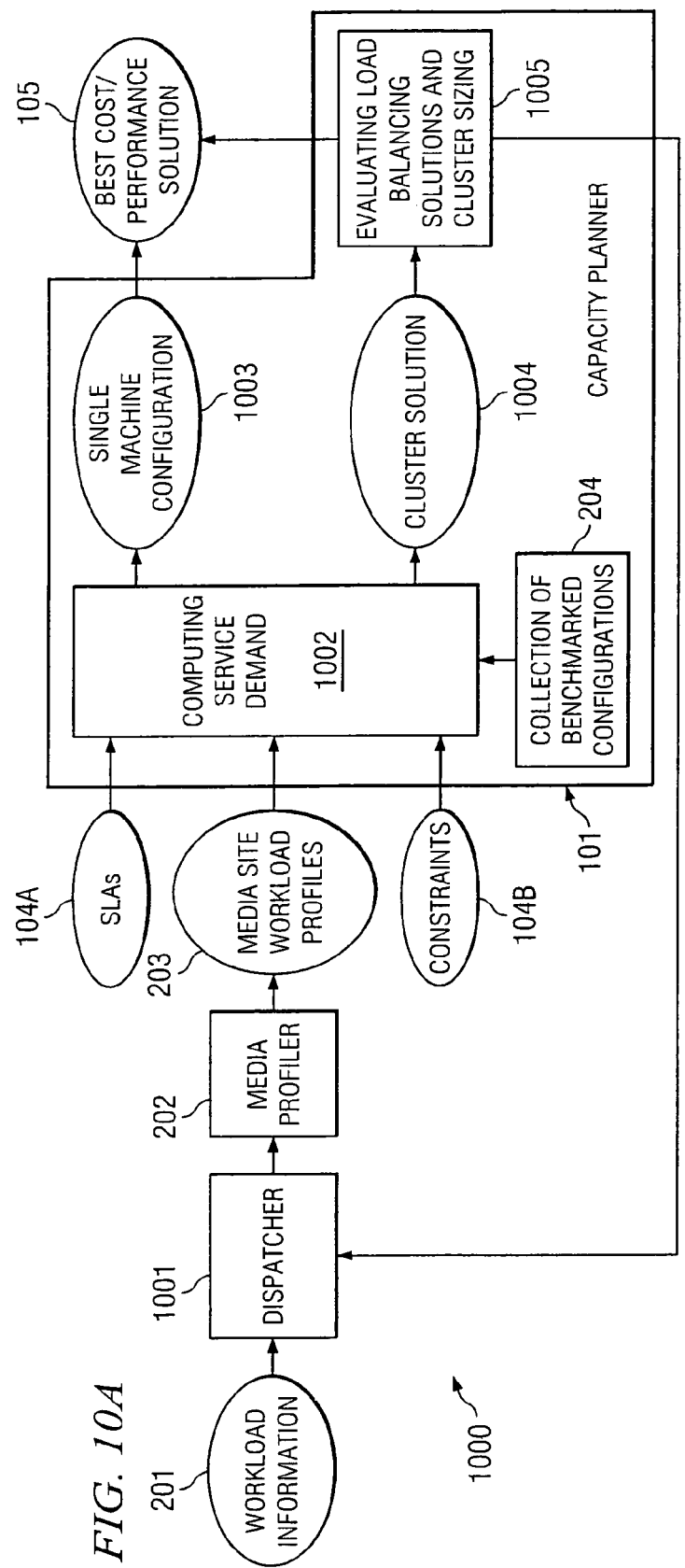
FIG. 10A shows an example of one embodiment of a capacity planning system for determining how many servers of a given configuration type are needed for supporting an expected workload.

Turning to FIG. 10A, one embodiment of a capacity planning system 1000 is shown. In this example embodiment, workload information 201 (e.g., the collected media server access logs for a service provider's site) is input to MediaProf 202 (via dispatcher 1001 in this example). MediaProf 202 generates Media site workload profiles 203 for each media server configuration under consideration, as described above. The generated workload profiles 203 are input to capacity planner 101. Additionally, service parameters such as SLAs 104A and constraints 104B are input to capacity planner 101. Using a collection of benchmarked configurations 204, as well as the received workload profiles 203, SLAs 104A, and constraints 104B, capacity planner 101 computes, in block 1002, a service Demand for each of the media server configurations under consideration in the manner described above.

For instance, for evaluating a first server configuration (e.g., having a given size of memory, etc.), capacity planner uses the corresponding benchmarks 204 (e.g., SFB and UFB) for such configuration along with the corresponding workload profile 203 (e.g., MP$_1$) for such configuration in computing the service Demand for that configuration in block 1002. From the computed service Demand for this first server configuration, capacity planner 101 determines whether a single one of such first server configuration can support the workload in a desired manner (e.g., in a manner that complies with SLAs 104A and constraints 104B). If determined that a single one of such first server configuration can support the workload in a desired manner, capacity planner identifies that such a media server configuration is suitable for supporting the workload in block 1003.

However, if capacity planner 101 determines from the computed service Demand that a single one of the first server configuration under consideration is not capable of supporting the workload in the desired manner, capacity planner identifies in block 1004 that a cluster of such first server configurations is needed. An initial determination of the number of nodes (i.e., the number of such first server configurations) to be included in the clustered media server solution is made from the computed service Demand. For example, if the computed service Demand for this first server configuration is 5 (or any number between 4 and 5, such as 4.5), then capacity planner 101 can initially determine that a cluster having 5 nodes is suitable for supporting the workload in the desired manner. Of course, this initial computation of the service Demand was made using the workload profile 203 generated for a single one of the first server configuration. Thus, while the initial computation of the service Demand is reliable for indicating whether a single one of the first server configuration is capable of supporting the workload or whether a cluster of such servers is needed, if the service Demand indicates that a cluster is needed, the specific number of nodes initially indicated by such service Demand (e.g., 5) may be less reliable because such number is estimated through an evaluation of the resources of a single one of the first server configuration (rather than an actual evaluation of the resources of a cluster having the estimated number of nodes and the type of load balancing strategy employed for such cluster). Accordingly, to verify that the initial indication of 5 nodes, in the above example, is accurate, capacity planner 101 re-computes the service Demand taking into consideration the resources and load balancing strategy of such a cluster.

As illustrated in the example of FIG. 10A, capacity planner 101 evaluates the load balancing strategy(ies) for the initially determined number of nodes (as indicated by the service Demand) in block 1005. The resources of such cluster of nodes and the load balancing strategy(ies) are taken into account in generating a new workload profile 203. For instance, dispatcher 1001 inputs identification of the resources of such a clustered media server, as well as identification of the load balancing strategy to be utilized by the cluster, into MediaProf 202, which generates the new workload profile 203 for such cluster.

Figure 10B:
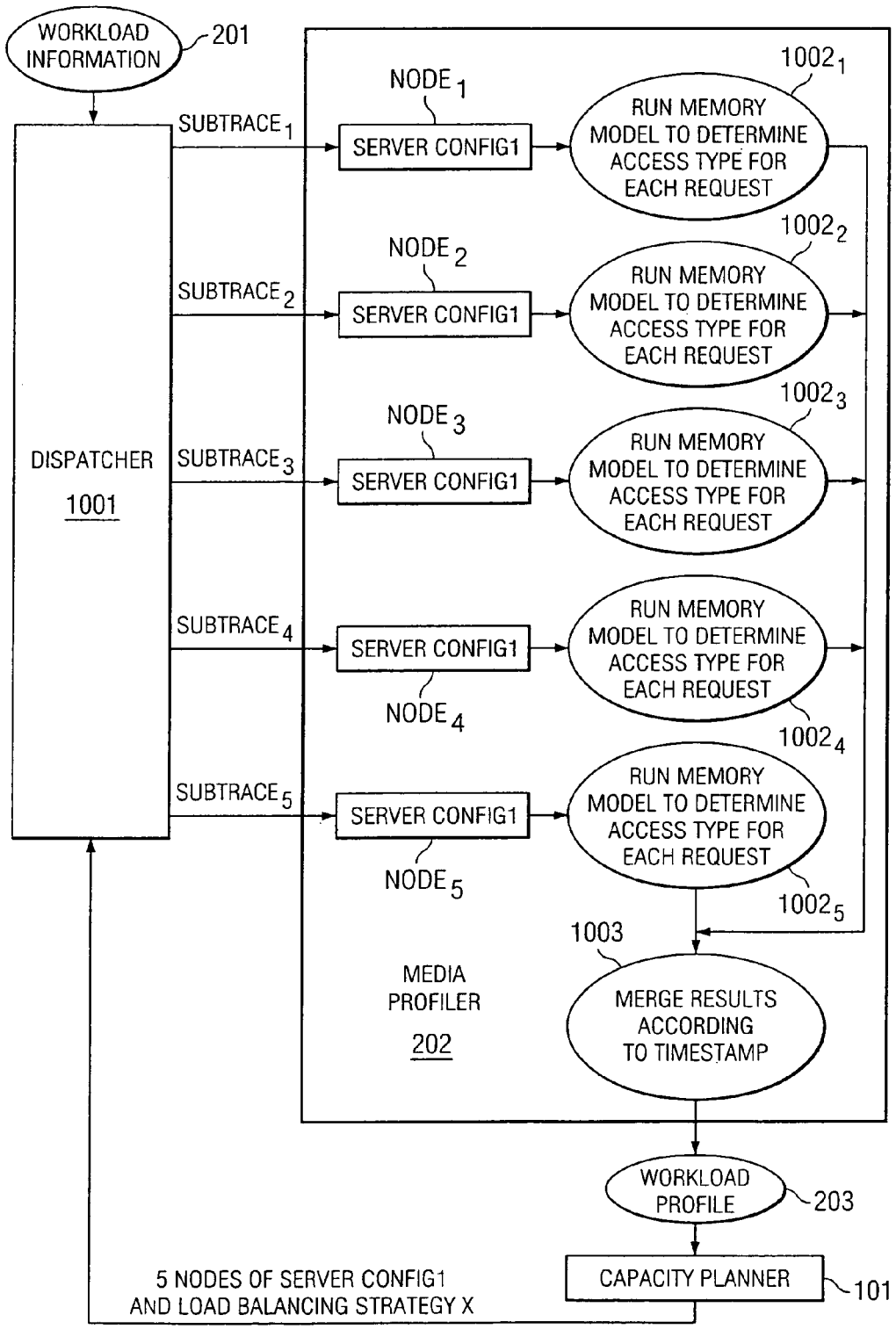
FIG. 10B shows an example of re-generating a workload profile for a cluster of servers of a particular configuration type in accordance with the example embodiment of FIG. 10A.

Turning to FIG. 10B, an example of re-generating workload profile 203 for a cluster of servers of a particular configuration type in accordance with one embodiment is shown. In this example, capacity planner 101 determines (e.g., from the service Demand computed for a single server of Server Config$_1$) that a cluster of 5 nodes of Server Config$_1$ are required for supporting the expected workload as desired (e.g., in compliance with SLAs 104$_A$ and Constraints 104$_B$). Capacity planner 101 notifies dispatcher 1001 of a cluster of 5 nodes of Server Config$_1$. In this example, capacity planner 101 also notifies dispatcher 1001 of a load balancing strategy "X" (e.g., round-robin, LARD, etc.) that is to be used by the cluster. Of course, such load balancing strategy may be provided to dispatcher 1001 in some other way in alternative embodiments, such as through user input, dispatcher 1001 reading the desired load balancing strategy to be used from a data storage device, etc. Additionally, a plurality of different load balancing strategies may be evaluated in certain embodiments. For instance, dispatcher 1001 may use a first load balancing strategy to generate subtraces (as described further below), which are used by media profiler 202 to generate a workload profile 203 for the cluster when using the first load balancing strategy, and dispatcher 1001 may use a second load balancing strategy to generate subtraces (as described further below), which are used by media profiler 202 to generate a workload profile 203 for the cluster when using this second load balancing strategy; and capacity planner 101 may compute the respective service Demand for each of the workload profiles.

Dispatcher 1001 uses the load balancing strategy (e.g., strategy X in the example of FIG. 10B) to generate subtraces (which may be referred to herein as "sub-workloads") for workload 201. That is, dispatcher 1001 divides workload 201 into 5 subtraces, Subtrace$_1$, Subtrace$_2$, . . . , Subtrace$_5$, wherein each subtrace identifies the portion of workload 201 (i.e., the corresponding requests) that is to be serviced by a corresponding one of the 5 nodes of Server Config$_1$ according to the load balancing strategy X employed by the cluster under consideration. For instance, in the example of FIG. 10B, Subtrace$_1$ is generated for Node$_1$ of Server Config$_1$, Subtrace$_2$ is generated for Node$_2$ of Server Config$_1$, Subtrace$_3$ is generated for Node$_3$ of Server Config$_1$, Subtrace$_4$ is generated for Node$_4$ of Server Config$_1$, and Subtrace$_5$ is generated for Node$_5$ of Server Config$_1$. Each of the resulting subtraces are input to MediaProf 202, which processes each subtrace for its corresponding node of Server Config$_1$ to determine the access types of each request (memory versus disk). For instance, in the example embodiment of FIG. 10B, in operational block 1002$_1$ MediaProf 202 runs the memory model (for Server Config$_1$) to determine the access type for each request in Subtrace$_1$ being serviced by Node$_1$. Similarly, in operational block 1002$_2$ MediaProf 202 runs the memory model (for Server Config$_1$) to determine the access type for each request in Subtrace$_2$ being serviced by Node$_2$. Likewise, in each of operational blocks 1002$_{3-5}$ MediaProf 202 runs the memory model (for Server Config$_1$) to determine the access type for each request in the respective Subtraces$_{3-5}$ being serviced by their corresponding Nodes$_{3-5}$. Then, in operational block 1003, MediaProf 202 merges the results determined in operations 1002$_{1-5}$ according to timestamp to generate a workload profile 203 for the cluster.

Accordingly, the newly generated workload profile 203 for the cluster under consideration identifies the number of concurrent requests serviced by the cluster at any given time, as well as an indication of the respective type of access for each request (memory versus disk). Therefore, the benchmarks and cost function for Server Config$_1$ can be used by capacity planner 101 to re-compute the service Demand for this cluster.

For instance, as shown in FIG. 10A, capacity planner 101 then uses the workload profile 203 generated for the cluster under consideration to compute, in block 1002, a service Demand for such cluster. This is used to verify that the initially determined number of nodes in the cluster is accurate. For instance, continuing with the above example, capacity planner 101 verifies that the service Demand computed for the cluster indicates that 5 nodes of the first server configuration (Server Config$_1$) under consideration are needed in the cluster for supporting the workload in the desired manner. If the service Demand computed for the cluster indicates that 5 nodes are needed, capacity planner 101 outputs such a 5-node cluster as one possible solution. On the other hand, if the service Demand computed for the cluster indicates a different number of nodes, such as 4, then capacity planner 101 repeats the above process for a cluster of 4 nodes in order to verify the estimate of 4 nodes.

Figure 11:
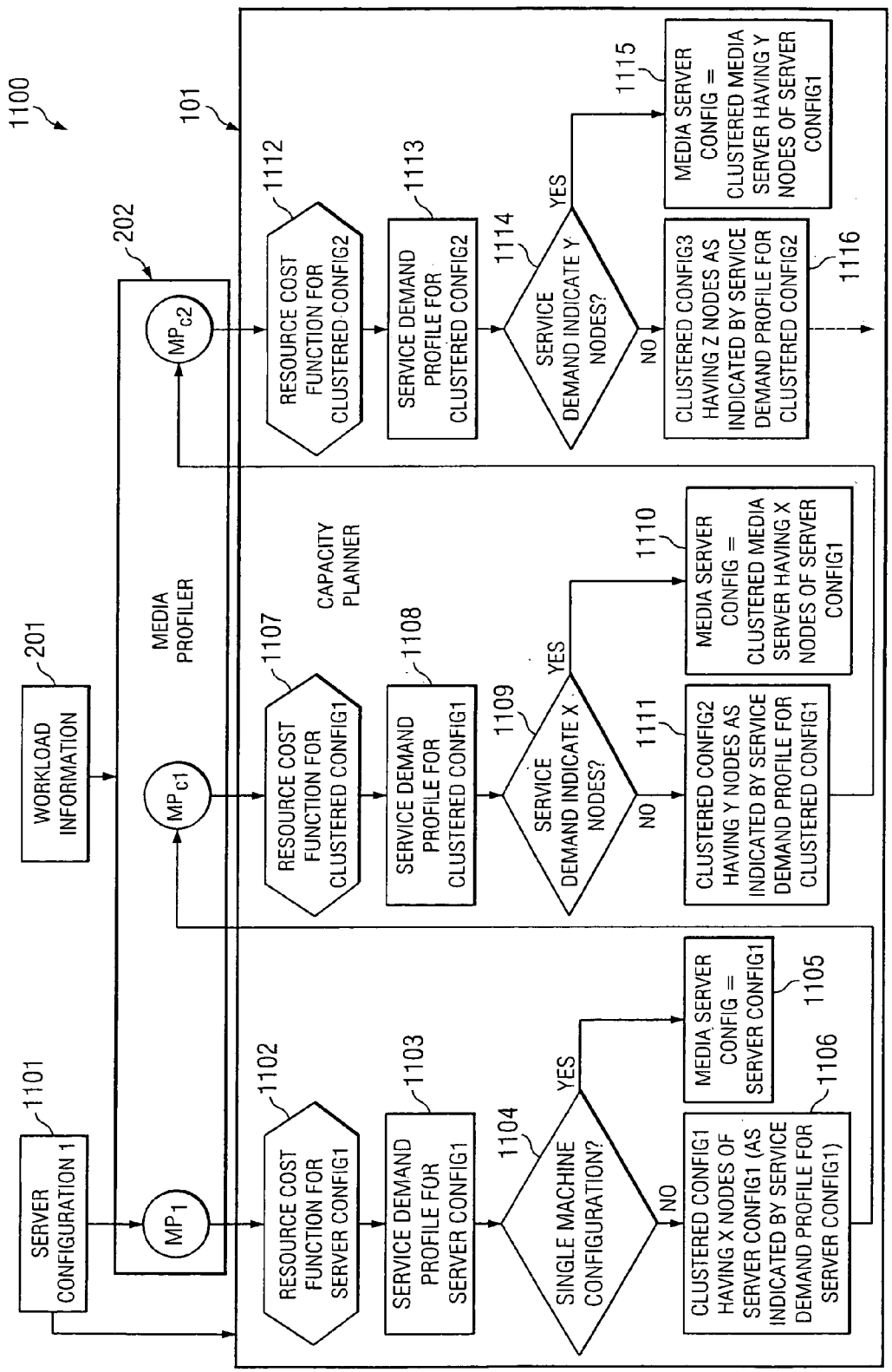
FIG. 11 shows an example embodiment of a capacity planning system, illustrating an iterative technique for determining a suitable media server solution for a given server configuration under consideration.

Turning now to FIG. 11, an iterative technique for determining a suitable media server solution for a given server configuration under consideration in accordance with one example embodiment is illustrated. In the example capacity planning system 1100 of FIG. 11, workload information 201 is input to MediaProf 202. For a given server configuration (e.g., having a given size of memory, etc.), shown as Server Config1 1101 in FIG. 11, that is under consideration, MediaProf 202 generates workload profile MP$_1$, such as the example workload profile 203 of FIG. 5 or FIG. 6. MP$_1$ is input to capacity planner 101. In this example implementation, capacity planner 101 uses a corresponding resource "cost" function 1102 to process the received workload profile MP$_1$ for Server Config1 1101. The cost function 1102 is used to generate a service demand profile 1103 for Server Config1, such as the example service demand profiles described above with FIGS. 9A-9B.

Capacity planner 101 uses service demand profile 1103 to evaluate in operational block 1104 whether a single one of Server Config1 has sufficient capacity for supporting the expected workload in a desired manner (e.g., in accordance with received service parameters 104). If determined in operational block 1104 that a single one of Server Config1 can support the expected workload in a desired manner, capacity planner 101 determines one possible solution for the media server as implementing a single one of Server Config1 (i.e., Media Server Config=Server Config1) in operational block 1105. However, if the service demand profile indicates that more than one of Server Config1 is needed for supporting the expected workload (i.e., the service demand profile 1103 for Server Config1 indicates that X nodes of Server Config1 are needed, wherein X>1), operation advances to block 1106 whereat capacity planner 101 identifies a clustered configuration, Clustered Config1, having X nodes of Server Config1. That is, Clustered Config1 has the resources of X number of Server Config1 machines clustered together.

Clustered Config1 is then input to MediaProf 202, which generates workload profile MP$_{C1}$ for such Clustered Config1, such as the example workload profile 203 of FIG. 5 or FIG. 6. MediaProf 202 may also receive an indication of a load balancing strategy that is to be used by the Clustered Config1, and MediaProf 202 may take such load balancing strategy (e.g., round-robin, LARD, etc.) into consideration in generating workload profile MP$_{C1}$. Thus, in this example MediaProf 202 includes the functionality of dispatcher 1001 described above in FIGS. 10A-10B. The generated MP$_{C1}$ is returned to capacity planner 101. In this example implementation, capacity planner 101 uses a corresponding resource "cost" function 1107 (e.g., the cost function for Server Config1) to process the received workload profile MP$_{C1}$ generated for Clustered Config1. The cost function 1107 is used to generate a service demand profile 1108 for Clustered Config1, such as the example service demand profiles described above with FIGS. 9A-9B.

Capacity planner 101 uses service demand profile 1108 to evaluate in operational block 1109 whether X nodes are needed in the cluster for supporting the expected workload in a desired manner. That is, capacity planner 101 uses the computed service demand profile 1108 to verify the accuracy of the initially determined number of X nodes. If determined in operational block 1109 that the service demand profile 1108 for the Clustered Config1 indicates X nodes, then capacity planner 101 determines one possible solution for the media server as implementing a cluster of X nodes of Server Config1 (i.e., Media Server Config=Clustered Media Server having X nodes of Server Config1) in operational block 1110. However, if the service demand profile 1108 for Clustered Config1 does not indicate X nodes (but instead indicates that Y nodes of Server Config1 are needed, wherein Y≠X), operation advances to block 1111 whereat capacity planner 101 identifies a different clustered configuration, Clustered Config2, having Y nodes of Server Config1.

Clustered Config2 is then input to MediaProf 202, which generates workload profile $MP_{C2}$ for such Clustered Config2, such as the example workload profile 203 of FIG. 5 or FIG. 6. MediaProf 202 may also receive an indication of a load balancing strategy that is to be used by the Clustered Config2, and MediaProf 202 may take such load balancing strategy (e.g., round-robin, LARD, etc.) into consideration in generating workload profile $MP_{C2}$. The generated $MP_{C2}$ is returned to capacity planner 101. In this example implementation, capacity planner 101 uses a corresponding resource "cost" function 1112 (e.g., the cost function for Server Config1) to process the received workload profile $MP_{C2}$ for Clustered Config2. The cost function 1112 is used to generate a service demand profile 1113 for Clustered Config2, such as the example service demand profiles described above with FIGS. 9A-9B.

Capacity planner 101 uses service demand profile 1113 to evaluate in operational block 1114 whether Y nodes are needed in the cluster for supporting the expected workload in a desired manner. That is, capacity planner 101 uses the computed service demand profile 1113 to verify the accuracy of the previously determined number of Y nodes. If determined in operational block 1114 that the service demand profile 1113 for the Clustered Config2 indicates Y nodes, then capacity planner 101 determines one possible solution for the media server as implementing a cluster of Y nodes of Server Config1 (i.e., Media Server Config=Clustered Media Server having Y nodes of Server Config1) in operational block 1115. However, if the service demand profile 1113 for Clustered Config2 does not indicate Y nodes (but instead indicates that Z nodes of Server Config1 are needed, wherein Z≠Y), operation advances to block 1116 whereat capacity planner 101 identifies a different clustered configuration, Clustered Config3, having Z nodes of Server Config1. The above iterative process continues until capacity planner 101 verifies the accuracy of the number of nodes for a cluster.

For simplicity, FIG. 11 shows an example technique for evaluating one server configuration, Server Config1 1101, that may be used for forming a media server solution. However, it should be recognized that capacity planner 101 may evaluate any number of different server configurations in a manner similar to that described for Server Config1 1101. Accordingly, a media server configuration solution may be determined for each of a plurality of different server configurations. For instance, a first media server configuration solution that is formed using Server Config1 may be identified by capacity planner 101, and a second media server configuration solution that is formed using a different server configuration (Server Config2) may also be identified by capacity planner 101. In certain embodiments, capacity planner 101 may compare the determined capacities and/or costs for each of the identified media server configuration solutions to determine the optimal (e.g., most cost effective) one of those solutions to be selected for implementation at the Service Provider's site for supporting the expected workload.

Techniques for evaluating the capacity of clustered servers in accordance with certain embodiments of a capacity planning system are now described. In certain embodiments, the capacity planning system assumes that each server (or node) in a media server cluster has access to all the media content. Therefore, any server can satisfy any client request. A cluster of N nodes represents N times greater processing power than a single node, and at the same time, it has N times larger combined memory. Thus, for an accurate sizing of a cluster solution, both its increased processing power and its increased memory size are taken into account by the capacity planning system.

Many traditional load balancing solutions for media server clusters, such as the round-robin strategy, try to distribute the requests uniformly to all the machines of the cluster. However, this may adversely affect an efficient memory usage because the frequently accessed content is replicated across the memories of all the machines. With this approach, a cluster having N times bigger memory (which is the combined memory of N nodes) might effectively utilize almost the same memory as one node. This observation led researchers to a design of "locality-aware" balancing strategies like LARD (see V. Paid, M. Aron, G. Banga, M. Svendsen, P. Drushel, W. Zwaenepoel, E. Nahum: Locality-Aware Request Distribution in Cluster-Based Network Servers, *Proc. of the 8th Intl. Conf. On Architectural Support for Programming Languages and Operating Systems (ASPLOS VIII)*, ACM SIGPLAN, 1998) and *DALA* (see Z. Ge, P. Ji, P. Shenoy, A Demand Adaptive and Locality Aware (DALA) Streaming Media Cluster Architecture, *Proc. of ACM NOSSDAV,* 2002) which aim to avoid the unnecessary file replication to improve the overall system performance.

For discussion purposes, consideration of the round-robin and LARD strategies by an embodiment of the capacity planning system are described further below. However, embodiments of the capacity planning system are not limited solely to these example load balancing strategies, but rather any load balancing strategy now known or later developed may be taken into consideration by embodiments of the capacity planning system in a similar manner. With the LARD strategy considered further below: initially, a first access to a file is assigned to a random node in a cluster, while the subsequent requests to the file are sent to the same, already assigned node. In this manner, the later requests to the same file may take advantage of the requested file being in memory of the node to which they are directed.

An example operational flow for evaluating the capacity of a clustered media server in accordance with one embodiment is shown in FIG. 12. For this example, let the outcome of the first iteration of the Capacity Planner for the original media cite workload be the capacity requirement of k nodes of a particular server configuration under consideration, in operational block 1201. In other words, with reference to FIG. 11 above, the service demand profile 1103 indicates k nodes of Server Config1. According to the example embodiment of FIG. 12, the capacity planning procedure then re-evaluates the identified cluster solution. More specifically, in operational block 1202, the dispatcher 1001 (of FIGS. 10A-B above) employs a corresponding load balancing strategy to partition the original media site workload W into k sub-workloads (as in operation 1003 of FIG. 10B) $W_1, W_2 \ldots, W_k$. That is, dispatcher 1001 takes into consideration a specified load balancing strategy, such as round-robin, LARD, etc., to identify k sub-workloads that will be experienced by the corresponding k nodes of the cluster. In operational block 1203, MediaProf 202 computes a media workload profile (such as the example workload profiles 203 of FIGS. 5 and 6) for each of sub-workloads $W_1, W_2 \ldots, W_k$.

In operational block 1204, the computed sub-workload profiles are merged into an overall media site workload profile by using the time stamps of individual sub-workload profiles. That is, the individual workload profiles for each of sub-workloads $W_1, W_2 \ldots, W_k$ are merged (by timestamp) to form an overall media site workload profile (such as the example workload profiles 203 of FIGS. 5 and 6). In operational block 1205, the overall media site workload profile is used by capacity planner 101 to compute an overall service demand profile (such as the example service demand profiles 901A and 901B of FIGS. 9A-9B). In the case of the LARD load balancing strategy, the service demand profile is, in certain embodiments, additionally computed for each of the sub-workloads $W_1, W_2 \ldots, W_k$ in order to provide a warning when a locality-aware request distribution leads to a significantly skewed load for different nodes.

In operational block 1206, the service demand requirement is combined with (evaluated in view of) the service parameters (such as specified SLAs and Constraints). In block 1207, the capacity planner 101 determines whether the outcome of operational block 1206 indicates that the capacity requirement is k nodes. If it does indicate the capacity requirement as being k nodes, then the cluster sizing is verified as being correct in block 1208 (i.e., the media server configuration solution=a clustered media server having k nodes of the server configuration type under consideration) and the capacity planning process for this considered cluster configuration is completed. On the other hand, if the computed capacity requirement is determined to be l nodes (l≠k), then a cluster configuration having l nodes is identified in block 1209 and the capacity planning process is repeated for the cluster configuration of l nodes (in which case k is set equal to l for each of the repeated operations of blocks 1202-1207).

In order to demonstrate how the above-described iterative process allows for accurate cluster sizing, let us consider the following example: For workload generation in this example, the publicly available, synthetic media workload generator MediSyn is used as described in W. Gang, Y. Fu, L. Cherkasova, and A. Vahdat, "MediSyn: A Synthetic Streaming Media Service Workload Generator," in *Proceedings of NOSSDAV*, June 2003. In this example, a synthetic media workload $W_{syn}$ that closely imitates the parameters of real enterprise media server workloads (see L. Cherkasova, M. Gupta, "Characterizing Locality, Evolution, and Life Span of Accesses in Enterprise Media Server Workloads", *Proc. of ACM NOSSDAV*, 2002) is used. Video duration distribution in $W_{syn}$ can be briefly summarized via the following six classes: 20% of the files represent short videos 0-2 min, 10% of the videos are 2-5 min, 13% of the videos are 5-10 min, 23% are 10-30 min, 21% are 30-60 min, and 13% of the videos are longer than 60 min. The file bit rates are defined by the following discrete distribution: 5% of the files are encoded at 56 Kb/s, 20% at 112 Kb/s, 50% at 256 Kb/s, and 25% at 500 Kb/s. Request arrivals are modeled by a Poisson process. In this example workload, on average, there is a new request arrival in 1 sec intervals.

The file popularity for workload $W_{syn}$ is defined by a Zipf-like distribution with α=1.34. In summary, $W_{syn}$ has a fileset with 800 files (with overall storage requirements of 41 GB), where 90% of the requests target 10% of the files in $W_{syn}$. Correspondingly, 10% of the most popular files in $W_{syn}$ have an overall combined size of 3.8 GB. For this example, let the capacity planning task be to find the appropriate media system configuration satisfying the following performance requirements while processing $W_{syn}$:

1) SLAs: for 99% of the time, the media server configuration solution is capable of processing a given workload without overload, and
2) Configuration Constraints: for 90% of the time, the media server configuration solution is utilized under 70% of its available capacity.

Further, let the benchmarked capacity of the server configuration of interest (e.g., Server Config1 of FIG. 11) be defined as shown in Table 1 below. Let us denote this media server type as $\hat{S}$.

TABLE 1

Benchmarked server capacity (e.g., for Server Config 1 of FIG. 11)

| | Server Capacity in Concurrent Streams for Files Encoded at a Given Bit Rate | | | |
|---|---|---|---|---|
| Benchmark | 56 Kb/s | 112 Kb/s | 256 Kb/s | 500 Kb/s |
| Single File Benchmark | 600 | 400 | 200 | 100 |
| Unique Files Benchmark | 125 | 80 | 40 | 20 |

For this example, we use $$cost_{X_i}^{disk} / cost_{X_i}^{memory} = 5,$$

i.e. the cost of disk access for files encoded at bit rate $X_i$ is 5 times higher than the cost of the corresponding memory access. Finally, let the memory sizes of interest be 0.5 GB and 1 GB (it should be recalled that memory size in this context means an estimate of what the system may use for a file buffer cache). To distinguish the specific server configuration with memory of $Size^{mem}$, we use a denotation $\hat{S}(Size^{mem})$.

FIG. 13 shows the computed Cumulative Density Function (CDF) of capacity requirements for processing the workload $W_{syn}$ on the media server $\hat{S}$ with two different memory sizes as a result of the first iteration of the capacity planning process. Table 2, below, summarizes the capacity demands for processing workload $W_{syn}$, by taking into account different performance requirements.

TABLE 2

Summary of capacity demands for $W_{syn}$ during the first iteration

| | Capacity Demands for Processing $W_{syn}$ | | | |
|---|---|---|---|---|
| Media Server Type | Max | SLAs | Configuration Constraints | Combined (rounded up) |
| $\hat{S}$(0.5 GB) | 4.6 | 4.3 | 3.9/0.7 = 5.6 | 6 |
| $\hat{S}$(1 GB) | 4 | 3.8 | 3.4/0.7 = 4.9 | 5 |

Thus, the maximum capacity required for the given workload processing on $\hat{S}$(0.5 GB) configuration is 4.6 servers. If we take into account the SLA requirements (i.e. capacity demands for 99-th percentile) then the required capacity is 4.3 servers. In order to satisfy the Configuration Constraints (i.e. solution should have a capacity that 90% of the time is utilized under 70%), the required capacity should be 3.9/0.7=5.6. Thus, after combining the SLAs and Configuration Constraints requirements and rounding them up to the nearest integer, the capacity requirement for processing $W_{syn}$ is 6 nodes of the server configuration $\hat{S}(0.5\ GB)$. Following the similar computation process, the capacity requirement for processing $W_{syn}$ is 5 nodes of the server configuration $\hat{S}(1\ GB)$.

Since the initial classification of client requests into memory/disk accesses as well as the subsequent computation of service demand profile is done on the basis of a "single node" memory model, and since the computed capacity requirement for processing $W_{syn}$ on the media server $\hat{S}$ is a multi-node solution, the capacity planning system re-evaluates the workload performance on the recommended solution by taking into account the specific load-balancing solution and the impact of increased memory in a cluster (due to multiple nodes). Let us first analyze the outcome for the round-robin load balancing strategy and the $\hat{S}(0.5\ GB)$ configuration. During the second iteration, this example embodiment of the capacity planning tool (and particularly dispatcher 1001 of FIG. 11) divides the original workload $W_{syn}$ into 6 sub-workloads $W_{syn}^1, W_{syn}^2, \ldots, W_{syn}^6$ in a round-robin manner. For each sub-workload $W_{syn}^i (1 \leq i \leq 6)$, MediaProf 202 classifies the client requests into memory/disk accesses on the basis of an individual "single node" memory model. Then the computed media sub-workload profiles are merged and the overall service demand profile is recomputed.

Figure 14A:
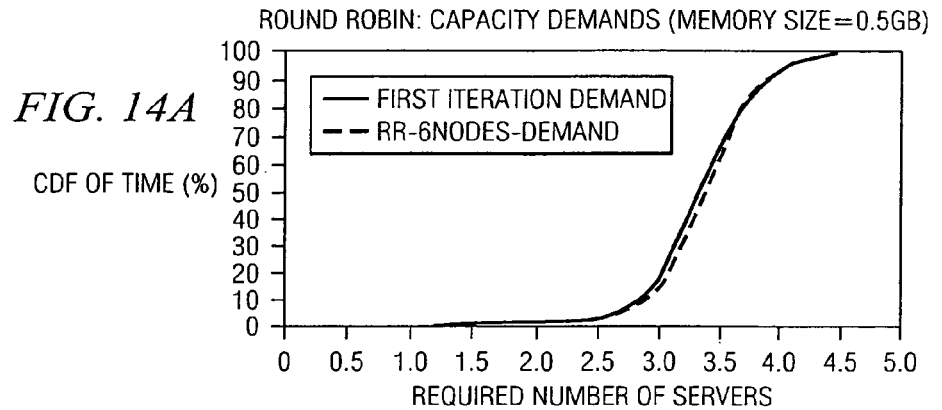
FIG. 14A shows the CDF of capacity requirements for the synthetic workload $W_{Syn}$ and 6 nodes of a media server $\hat{S}(0.5$ GB) using a round-robin load balancing strategy.
Figure 14B:
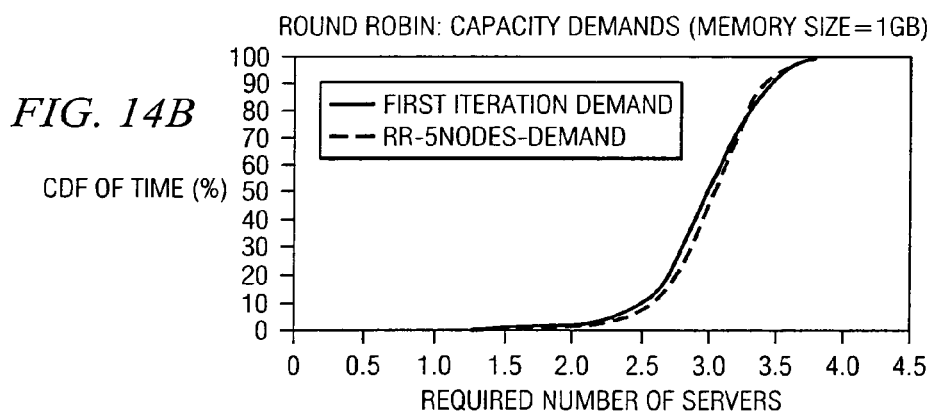
FIG. 14B shows the CDF of capacity requirements for the synthetic workload $W_{Syn}$ and 5 nodes of a media server $\hat{S}(1$ GB) using a round-robin load balancing strategy.

FIG. 14A shows the CDF of capacity requirements for a given synthetic workload $W_{syn}$ and 6 nodes of media server $\hat{S}(0.5\ GB)$ using the round-robin load balancing strategy. FIG. 14B shows the corresponding results for 5 nodes of media server $\hat{S}(1\ GB)$. In this example, the outcome of the second iteration confirms the predicted workload performance on recommended solutions when the round-robin load balancing strategy is used. Since the round-robin strategy distributes the requests uniformly to all the machines, this prohibits an efficient memory usage in a cluster because popular content is replicated across the memories (file buffer caches) of all the machines. As FIGS. 14A-14B show, with the round-robin strategy, the increased memory (due to combined memory of multiple nodes in the cluster) does not provide the additional performance benefits.

Now, let us analyze the outcome for the LARD load balancing strategy and the $\hat{S}(0.5\ GB)$ configuration. During the second iteration, the dispatcher 1001 in this example embodiment of the capacity planning system divides the original workload $W_{syn}$ into 6 sub-workloads $W_{syn}^1, W_{syn}^2, \ldots, W_{syn}^6$ according to the LARD strategy. For each sub-workload $W_{syn}^i (1 \leq i \leq 6)$, MediaProf 202 classifies the client requests into memory/disk accesses on the basis of an individual "single node" memory model. Then the computed media sub-workload profiles are merged and the overall service demand profile is recomputed.

The first row in Table 3, below, summarizes the capacity demands for processing workload $W_{syn}$ using 6 nodes of media server $\hat{S}(0.5\ GB)$ and applying LARD as a load balancing strategy.

TABLE 3

Summary of capacity demands for $Ws_{yn}$ and different size cluster configurations using LARD as a load balancing strategy.

| Media Server Type | Capacity Demands for Processing $W_{syn}$ | | | |
|---|---|---|---|---|
| | Nodes | SLAs | Configuration Constraints | Combined (rounded up) |
| $\hat{S}(0.5\ GB)$ | 6 | 3 | 2.8/0.7 - 4 | 4 |
| $\hat{S}(0.5\ GB)$ | 4 | 3.4 | 3/0.7 = 4.3 | 5 |
| $\hat{S}(0.5\ GB)$ | 5 | 3.2 | 2.9/0.7 = 4.1 | 5 |

TABLE 3-continued

Summary of capacity demands for $Ws_{yn}$ and different size cluster configurations using LARD as a load balancing strategy.

| Media Server Type | Capacity Demands for Processing $W_{syn}$ | | | |
|---|---|---|---|---|
| | Nodes | SLAs | Configuration Constraints | Combined (rounded up) |
| $\hat{S}(1\ GB)$ | 5 | 2.8 | 2.5/0.7 = 3.6 | 4 |
| $\hat{S}(1\ GB)$ | 4 | 2.8 | 2.6/0.7 = 3.7 | 4 |

As one can see, increased memory (due to 6 nodes in the cluster) helps to improve system performance, and the outcome recommendation of the second iteration is a 4-node configuration. Then the capacity planning process performs a third iteration to re-evaluate workload performance on the recommended solution of 4 nodes. However, the capacity of the combined memory and computing power of a 4-node configuration does not satisfy the specified performance requirements as shown by the outcome of the third iteration in Table 3 (i.e., the second row of Table 3): the computed capacity requirement is a 5-node solution. Finally, a fourth iteration (summarized by the third row in Table 3), re-evaluates the workload performance on the 5-node configuration and confirms that the 5-node cluster solution with the LARD strategy satisfies the specified performance requirements.

As shown in the fourth row of Table 3, the capacity planning process for the $\hat{S}(1\ GB)$ media server and LARD load balancing strategy evaluates the 5-node configuration (which is the outcome of the first iteration). The second iteration determines recommends a 4-node configuration, which is verified in the third iteration. Thus, the solution for the $\hat{S}(1\ GB)$ media server and LARD load balancing strategy converges after the third iteration with recommended configuration of 4 nodes.

Figure 15A:
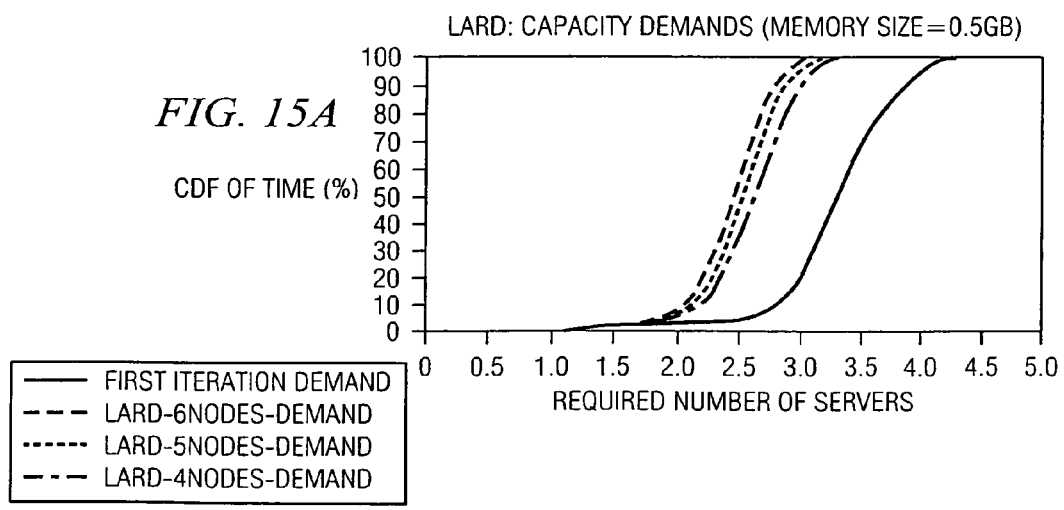
FIG. 15A shows the CDF of capacity requirements for the synthetic workload $W_{syn}$ and 4-6 nodes of a media server $\hat{S}(0.5$ GB) using LARD as a load balancing strategy.
Figure 15B:
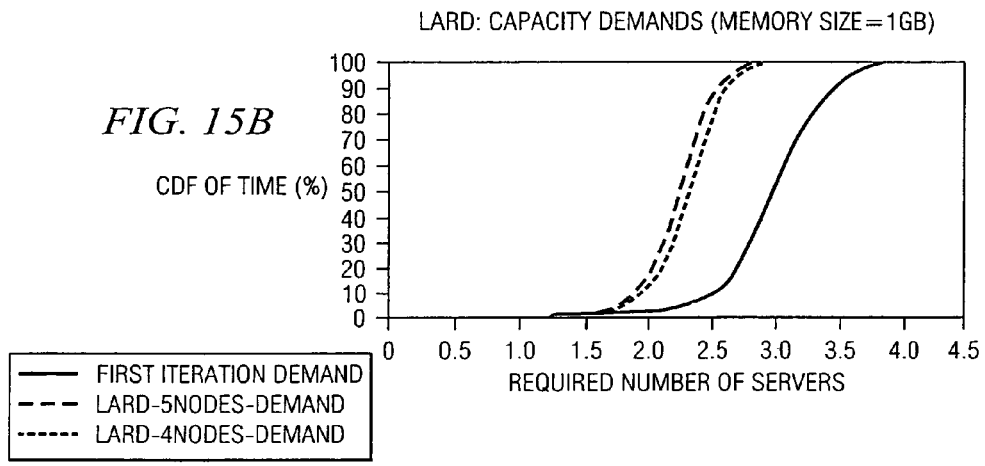
FIG. 15B shows the CDF of capacity requirements for the synthetic workload $W_{syn}$ and 5-6 nodes of a media server $\hat{S}(1$ GB) using LARD as a load balancing strategy.

FIG. 15A shows the CDF of capacity requirements for a given synthetic workload $W_{syn}$ and 4-6 nodes of media server $\hat{S}(0.5\ GB)$ using LARD as a load balancing strategy. FIG. 15B shows corresponding results for 5-6 nodes of media server $\hat{S}(1\ GB)$. Since the requests for the same file are sent by LARD to the same node in the cluster, it helps to avoid the unnecessary file replication and to utilize the overall cluster memory more efficiently, and as a result to improve the overall system performance.

Table 4, below, summarizes the configuration choices for processing workload $W_{syn}$ when using media server $\hat{S}$ with different memory sizes (0.5 GB and 1 GB) and employing different request distribution strategies in the cluster in the above example.

TABLE 4

Summary of capacity demands for $W_{syn}$ and different load balancing strategies.

| Media Server Type | Capacity Demands for Processing $W_{syn}$ with Different Load Balancing Strategies | |
|---|---|---|
| | Round-robin | LARD |
| $\hat{S}(0.5\ GB)$ | 6 | 5 |
| $\hat{S}(1\ GB)$ | 5 | 4 |

Overall, the cluster configuration with LARD as a balancing strategy outperforms the cluster configuration with the round-robin strategy for processing workload $W_{syn}$. By taking into consideration the price information of the corresponding configurations, a service provider may choose whether to deploy 5 nodes of media server Ŝ with 0.5 GB of memory for file buffer cache or rather to deploy 4 nodes with upgraded memory of 1 GB.

The conclusion derived in the above example is workload dependent. For example, for a media workload with a small "footprint" of very hot files that entirely fit in memory, the round-robin strategy may provide a better load balancing solution against the LARD strategy. The example capacity planning system in the above example, based on the iterative process described above, helps in evaluating the appropriate load balancing solutions and sizing the media server cluster to satisfy the desirable performance requirements of a given workload.

Figure 16A:
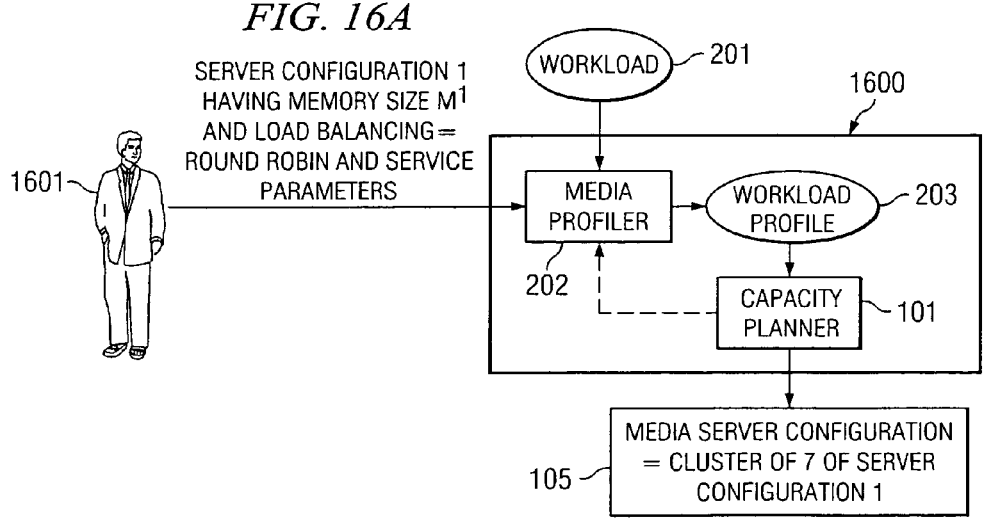
FIG. 16A shows an example of one embodiment of a capacity planning system, wherein a user (e.g., a service provider) inputs information specifying a particular type of server configuration to be considered, a load balancing strategy to be used for a clustered media server, and service parameters.

FIG. 16A shows an example of one embodiment of a capacity planning system 1600, wherein a user (e.g., a service provider) 1601 inputs information specifying a particular type of server configuration to be considered (i.e., Server Config1 having memory size $M_1$ in this example), a load balancing strategy to be used for a clustered media server (i.e., a round-robin strategy in this example), and service parameters 104. For instance, in certain situations, a service provider 1601 may want to evaluate a particular type of server configuration (e.g., Server Config1) and load balancing strategy to determine the number of nodes of such type of server configuration needed to support the service provider's expected workload in compliance with the specified service parameters. As described with the example embodiments above, workload information 201 is also supplied to MediaProf 202, which generates a workload profile 203. Capacity planner 101 uses the workload profile 203 to determine the number of nodes of the specified type of configuration to be included in a cluster for supporting the expected workload in the desired manner. As described above, capacity planner 101 may use an iterative technique for computing a service demand for this configuration under consideration and verifying the number of nodes indicated by such service demand. In this example, capacity planner 101 outputs solution information 105 indicating that the media server configuration solution is a cluster of 7 of Server Config1 nodes.

Figure 16B:
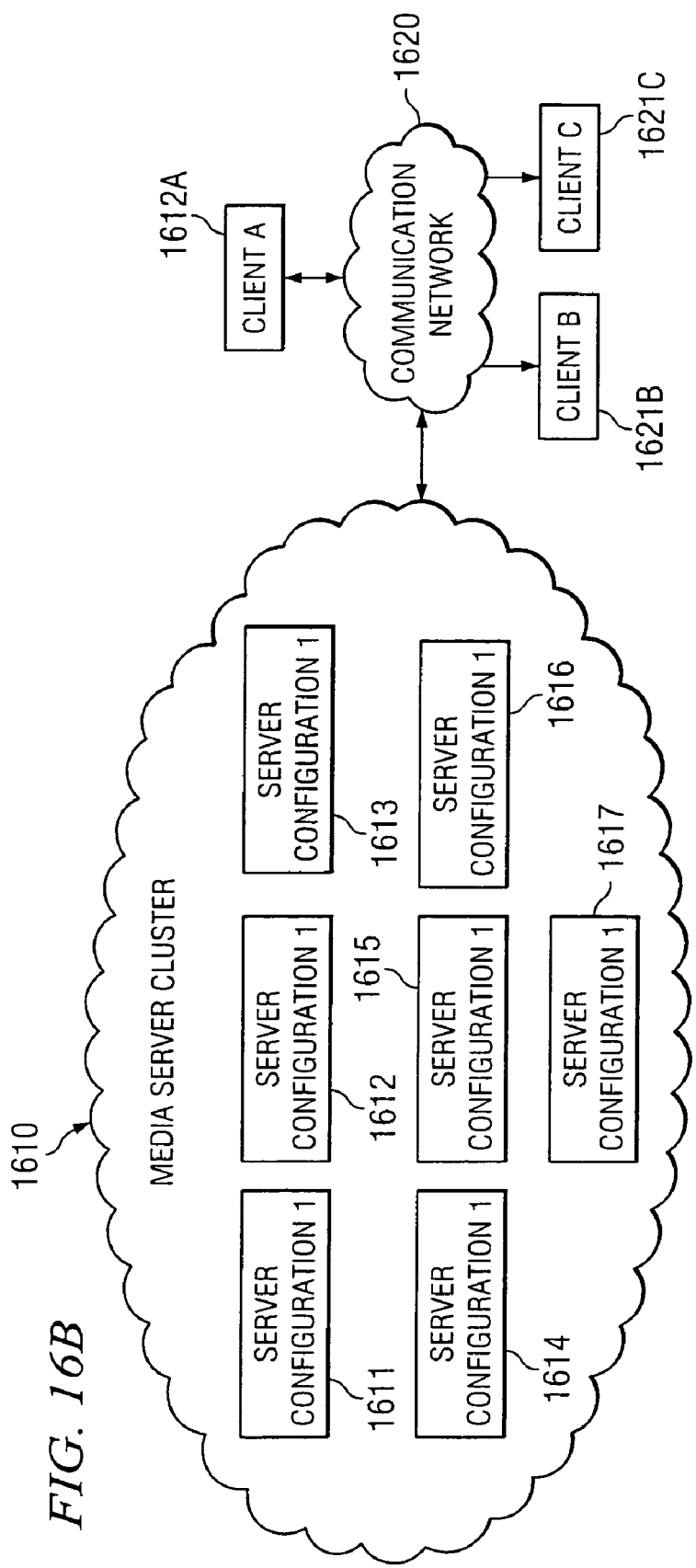
FIG. 16B shows an example of a media server cluster that the service provider may implement in accordance with the solution provided by the capacity planning system of FIG. 16A.

Accordingly, in the example of FIG. 16A, capacity planner 101 indicates that the media server configuration solution for service provider 1601 is a cluster of 7 of Server Config1 nodes. The service provider has specified in this example that a round-robin load balancing strategy is to be used for the cluster. FIG. 16B shows an example of a media server cluster 1610 that service provider 1601 may implement in accordance with the solution provided by the capacity planning system 1600. Accordingly, media server cluster 1610 has 7 nodes (1611-1617) of Server Config1, as specified by output 105 of capacity planning system 1600 in FIG. 16A. Such media server cluster 1610 may be employed by service provider 1601 for serving streaming media files to clients, such as client A 1621A, client B 1621B, and client C 1621C, via communication network 1620, which may be, for example, the Internet or other Wide Area Network (WAN), a local area network (LAN), a wireless network, any combination of the above, or any other communication network now known or later developed within the networking arts which permits two or more computers to communicate with each other.

Figure 17:
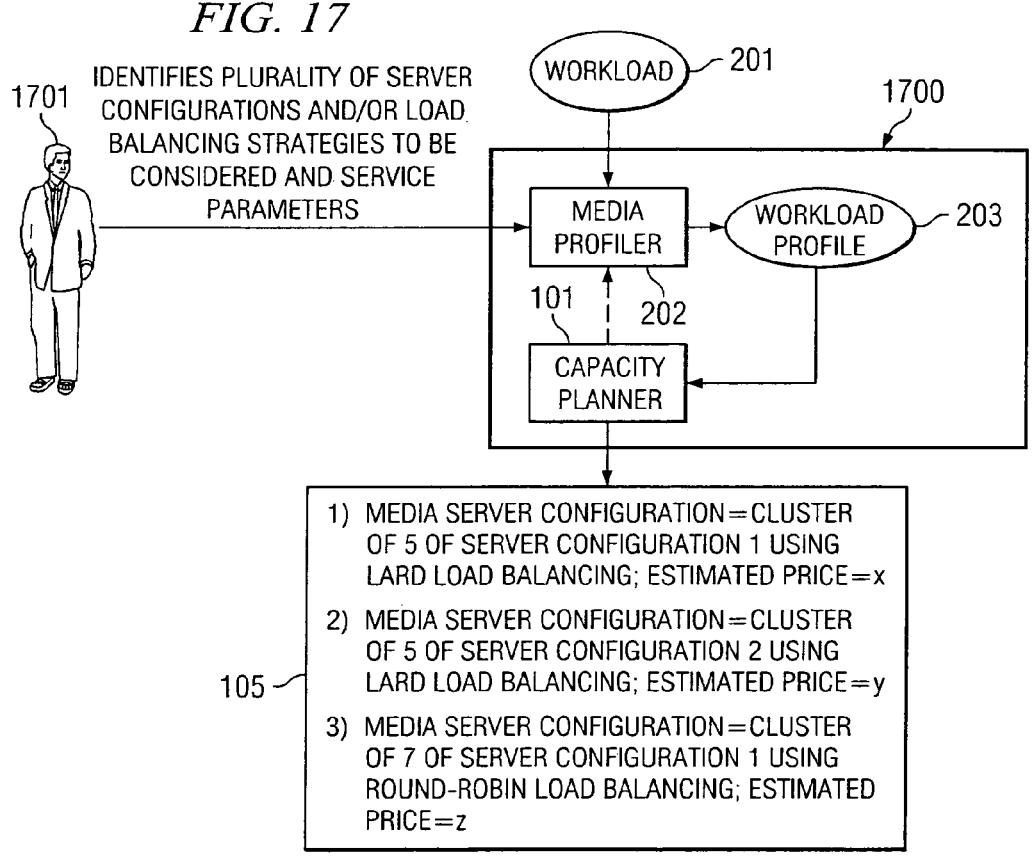
FIG. 17 shows another example embodiment of a capacity planning system, wherein a user (e.g., a service provider) inputs information identifying a plurality of different server configurations and/or load balancing strategies to be evaluated, as well as specifying service parameters.

FIG. 17 shows another example embodiment of a capacity planning system 1700, wherein a user (e.g., a service provider) 1701 inputs information identifying a plurality of different server configurations and/or load balancing strategies to be evaluated, as well as specifying service parameters 104. For instance, the user may select ones of various different server configurations and/or load balancing strategies from a list presented by system 1700. Additionally or alternatively, the user may input sufficient information about a server configuration (e.g., its memory size, etc.) to enable capacity planning system 1700 to be capable of evaluating its capacity, and/or the user may input sufficient information detailing the type of load balancing employed for the type(s) of load balancing strategies desired to be considered. Accordingly, a user may either select configurations and load balancing strategies from the system 1700, or the user may supply sufficient information to define a type of configuration and/or load balancing strategy for the system 1700. In certain implementations, a pre-defined list of server configurations and load balancing strategies are evaluated by system 1700, and thus the user 1701 may not be required to input any information indicating those desired to be evaluated.

In certain situations, a service provider 1701 may want to evaluate a plurality of different media server configuration solutions (e.g., to determine one of those solutions that is most attractive to the service provider). As described with the example embodiments above, workload information 201 is also supplied to MediaProf 202, which generates workload profiles 203 (e.g., $MP_1, MP_2, \ldots, MP_k$ for k different server configurations being considered). Capacity planner 101 uses the workload profiles 203 to determine the number of nodes of each type of server configuration being considered to be included in a cluster for supporting the expected workload in the desired manner. As described above, capacity planner 101 may use an iterative technique for computing a service demand for each configuration under consideration and verifying the number of nodes indicated by such service demand. In this example, capacity planner 101 outputs solution information 105 indicating that the following media server configuration solutions are available: 1) Media Server Config.=cluster of 5 of Server Config1 using LARD load balancing, with estimated price=$X; 2) Media Server Config.=cluster of 5 of Server Config2 using LARD load balancing, with estimated price=$Y; 3) Media Server Config.=cluster of 7 of Server Config1 using round-robin load balancing, with estimated price=$Z . . . . Thus, the service provider 1701 may compare the various solutions, including their relative prices, and select a solution that is considered most attractive, and the service provider 1701 has knowledge that such solution is capable of supporting the service provider's expected workload in a desired manner.

Figure 18:
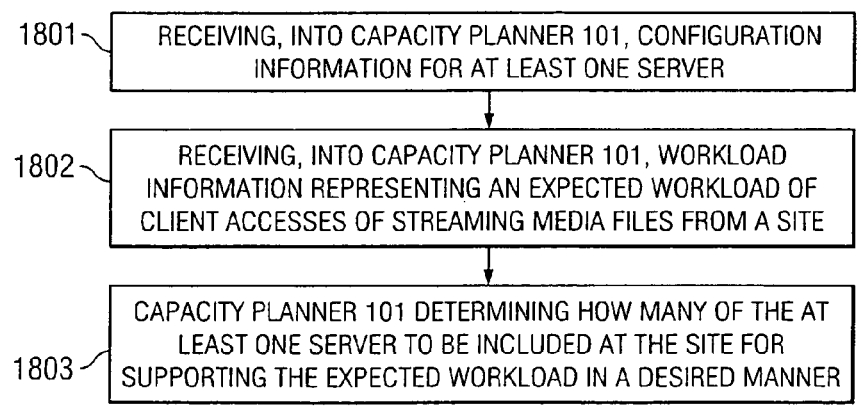
FIG. 18 shows an operational flow diagram of one embodiment for using a capacity planning tool.

FIG. 18 shows an operational flow diagram of one embodiment for using a capacity planning tool, such as the example capacity planning systems described above. As shown, operational block 1801 receives configuration information for at least one server into a capacity planning tool. As examples, capacity planner 101 may have such configuration information input by a user (e.g., a service provider), or capacity planner 101 may read such configuration information from a data storage device (e.g., RAM, hard disk, etc.) of the capacity planning system (e.g., the configuration information may be pre-stored to the capacity planning system). Operational block 1802 receives into the capacity planning tool workload information representing an expected workload of client accesses of streaming media files from a site. In operational block 1803, capacity planner 101 determines how many of the at least one server to be included at the site for supporting the expected workload in a desired manner (e.g., in compliance with service parameters 104).

Figure 19:
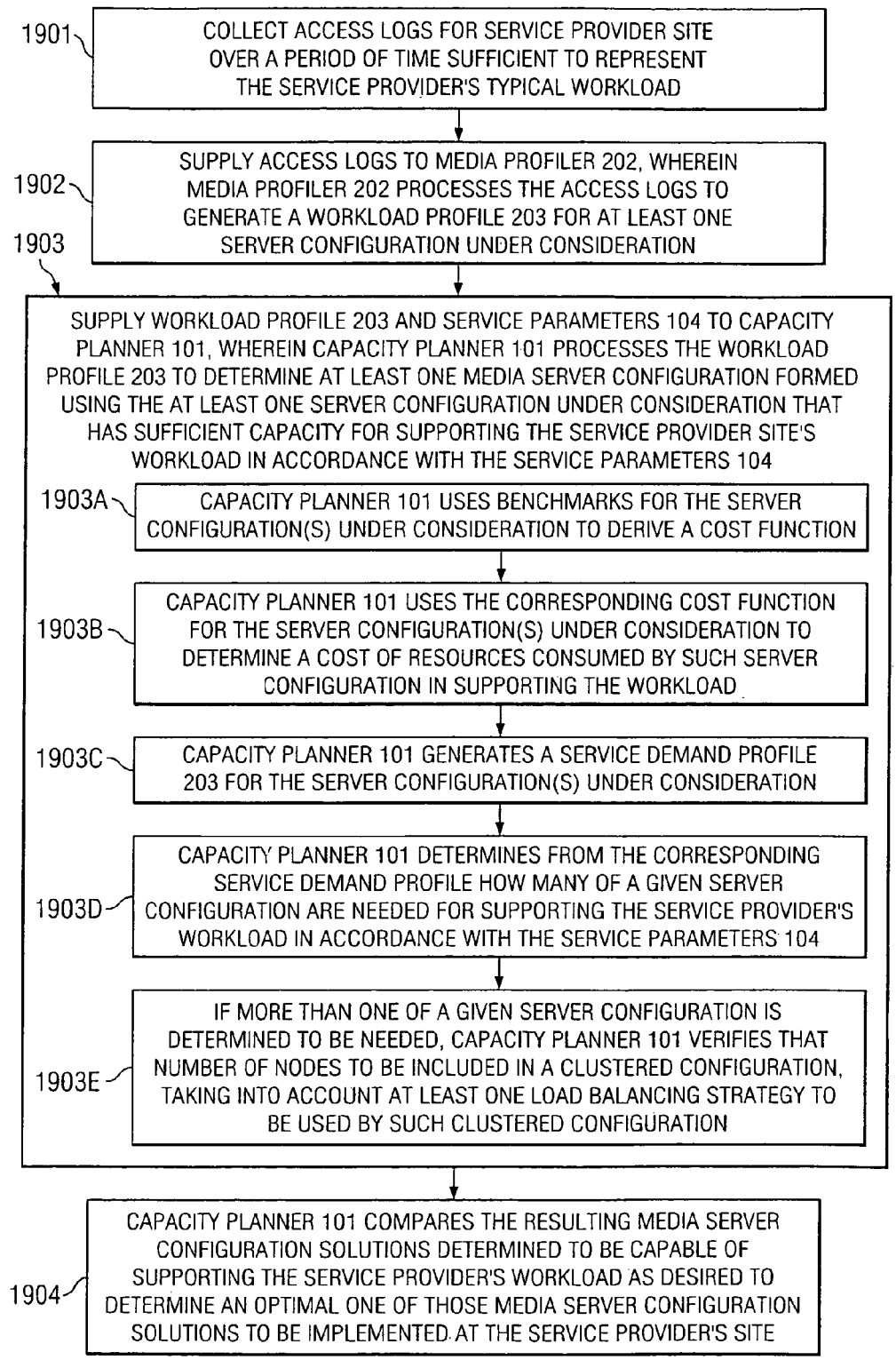
FIG. 19 shows an operational flow diagram of an example implementation of an embodiment for determining one or more media server configurations having sufficient capacity for supporting an expected workload of a service provider.

FIG. 19 shows an operational flow diagram of an example implementation of an embodiment for determining one or more media server configurations having sufficient capacity for supporting an expected workload of a service provider. In operational block 1901, access logs are collected for a service provider site over a period of time sufficient to represent the service provider's typical workload. In operational block 1902, the access logs are supplied to a media profiler 202, and the media profiler 202 processes the access logs to generate a workload profile 203 for at least one server configuration under consideration (e.g., Server Config1 in the example of FIG. 11). In operational block 1903, the workload profile 203 generated by the workload profiler 202 is supplied to a capacity planner 101, and the capacity planner 101 is supplied desired service parameters. The capacity planner 101 processes the workload profile 203 to determine at least one media server configuration formed using the at least one server configuration under consideration that has sufficient capacity for supporting the service provider site's workload in accordance with the service parameters 104. That is, capacity planner 101 determines one or more media server configuration(s) (e.g., single-machine and/or clustered implementations) that can be formed with the at least one server configuration under consideration and that are capable of supporting the service provider site's workload in accordance with the desired service parameters.

In performing operational block 1903, the capacity planner 101, in certain implementations, performs the operations 1903$_A$, 1903$_B$, 1903$_C$, 1903$_D$, and 1903$_E$ as shown in the example of FIG. 19. For instance, the capacity planner 101, in block 1003$_A$, uses benchmarks for the server configuration(s) under consideration to derive a cost function for such server configuration(s). In block 1903$_B$, the capacity planner uses the corresponding cost function for the server configuration(s) under consideration to determine a cost of resources consumed by the corresponding server configuration(s) in supporting the workload. In block 1903$_C$, the capacity planner 101 generates a service demand profile (such as profiles 901A and 901B of FIGS. 9A-9B) for the server configuration(s) under consideration. In block 1903$_D$, the capacity planner 101 determines from the corresponding service demand profile how many of a given server configuration are needed for supporting the service provider's workload in accordance with the service parameters 104. For instance, as described above in connection with FIGS. 11-12, this initial computation of the service demand profile based on the resources of a single machine of a given server configuration provides an indication of whether a single machine or a cluster of such server configurations is needed to support the expected workload for the service provider's site. If more than one of a given server configuration is determined to be needed (i.e., a cluster configuration is determined to be needed), the capacity planner 101 verifies, in block 1903$_E$, the number of nodes to be included in a clustered configuration, taking into account at least one load balancing strategy to be used by such clustered configuration. For instance, as described above in connection with FIGS. 11-12, an iterative process may be used wherein the media profile and service demand profile are re-computed for a cluster of the number of nodes as initially determined by the capacity planner 101 to verify that the estimated number of nodes holds true when the actual resources of such a cluster are used in the evaluation process.

In block 1904, the capacity planner may, in some instances, compare the resulting media server configuration solutions determined to be capable of supporting the service provider's workload as desired to determine an optimal one of those media server configuration solutions to be implemented at the service provider's site (e.g., based on relative price, overall capacity/performance, etc.).

When implemented via computer-executable instructions, various elements of embodiments described herein for evaluating server configuration(s) capacity for supporting an expected workload are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 20:
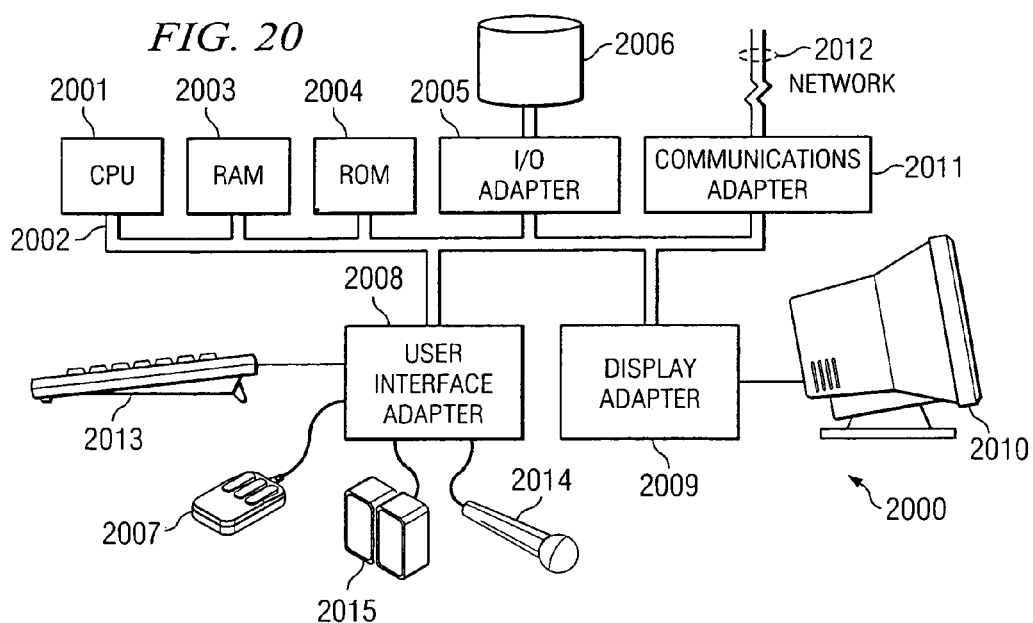
FIG. 20 shows an example computer system adapted to provide an embodiment of a capacity planning system.

FIG. 20 illustrates an example computer system 2000 adapted according to an embodiment for evaluating server configuration(s') capacity for supporting an expected workload. That is, computer system 2000 comprises an example system on which embodiments described herein may be implemented. Central processing unit (CPU) 2001 is coupled to system bus 2002. CPU 2001 may be any general purpose CPU. The above-described embodiments of a capacity planning system are not restricted by the architecture of CPU 2001 as long as CPU 2001 supports the inventive operations as described herein. CPU 2001 may execute the various logical instructions according to embodiments described herein. For example, CPU 2001 may execute machine-level instructions according to the exemplary operational flows described above in conjunction with FIGS. 10, 11, 12, 18, and 19.

Computer system 2000 also preferably includes random access memory (RAM) 2003, which may be SRAM, DRAM, SDRAM, or the like. Computer system 2000 preferably includes read-only memory (ROM) 2004 which may be PROM, EPROM, EEPROM, or the like. RAM 2003 and ROM 2004 hold user and system data and programs, as is well known in the art.

Computer system 2000 also preferably includes input/output (I/O) adapter 2005, communications adapter 2011, user interface adapter 2008, and display adapter 2009. I/O adapter 2005, user interface adapter 2008, and/or communications adapter 2011 may, in certain embodiments, enable a user to interact with computer system 2000 in order to input information thereto.

I/O adapter 2005 preferably connects storage device(s) 2006, such as one or more of hard drive, compact disc (CD) drive, floppy disk drive, tape drive, etc. to computer system 2000. The storage devices may be utilized when RAM 2003 is insufficient for the memory requirements associated with storing data for application programs. RAM 2003, ROM 2004, and/or storage devices 2006 may be used for storing computer-executable code for evaluating the capacity of a server configuration in accordance with the embodiments described above. Communications adapter 2011 is preferably adapted to couple computer system 2000 to network 2012.

User interface adapter 2008 couples user input devices, such as keyboard 2013, pointing device 2007, and microphone 2014 and/or output devices, such as speaker(s) 2015 to computer system 2000. Display adapter 2009 is driven by CPU 2001 to control the display on display device 2010.

It shall be appreciated that the embodiments of a capacity planning system described herein are not limited to the architecture of system 2000. For example, any suitable processor-based device may be utilized, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments described above.

What is claimed is:

1. A method comprising:

receiving, into a capacity planning system including a computer system, workload information representing an expected workload of client accesses of streaming media files from a site;

said capacity planning system determining, for at least one server configuration, how many servers of said at least one server configuration to be included at said site for supporting the expected workload in a target manner, wherein said determining how many servers of said at least one server configuration to be included at said site for supporting the expected workload in the target manner comprises:

computing, for resources of a single server of said at least one server configuration, a first service demand under the expected workload;

determining from said first service demand if said single server has sufficient capacity for supporting the expected workload in the target manner; and in response to determining that said single server does not have sufficient capacity for supporting the expected workload in the target manner, estimating from the first service demand a number of servers of said at least one server configuration that when clustered together in a cluster provide sufficient capacity for supporting the expected workload in the target manner; and said capacity planning system selecting a type of load balancing strategy from among a plurality of types of load balancing strategies to use for the expected workload.

2. The method of claim 1 wherein said workload information includes identification of a number of concurrent client accesses of said streaming media files from said site over a period of time.

3. The method of claim 2 wherein said workload information further includes identification of a corresponding encoding bit rate of each of said streaming media files accessed.

4. The method of claim 1 further comprising:

receiving, into said capacity planning system, configuration information for said at least one server configuration.

5. The method of claim 1 wherein said determining how many servers of said at least one server configuration to be included at said site for supporting the expected workload in the target manner further comprises:

computing a cost corresponding to resources of said at least one server configuration that are consumed in supporting the expected workload.

6. The method of claim 5 wherein said computing said cost comprises:

computing a cost of consumed resources for a stream in said expected workload having a memory access to a streaming media file; and computing a cost of consumed resources for a stream in said expected workload having a disk access to a streaming media file.

7. The method of claim 1 further comprising:

receiving at least one service parameter associated with a service level agreement, and identifying plural server configurations that are able to support the expected workload in accordance with the service level agreement, wherein the at least one server configuration is one of the plural server configurations.

8. The method of claim 7 wherein said at least one service parameter comprises information identifying at least one performance criteria to be satisfied by said site in supporting the expected workload in the target manner.

9. The method of claim 7 wherein said determining how many servers of said at least one server configuration to be included at said site for supporting the expected workload in the target manner comprises:

determining how many servers of said at least one server configuration to be included at said site for supporting the expected workload in a manner that satisfies said at least one service parameter.

10. The method of claim 1, wherein said determining how many servers further comprises, in response to determining that said single server does not have sufficient capacity for supporting the expected workload in the target manner, computing for resources of the cluster of the number of servers, a second service demand under the expected workload, the method further comprising:

analyzing the second service demand to verify whether the number of servers estimated from the first service demand is accurate.

11. The method of claim 1, wherein the plural types of load balancing strategies include a round robin strategy and a locality-aware strategy.

12. The method of claim 1, wherein determining how many servers of said at least one server configuration to be included at said site for supporting the expected workload in the target manner comprises determining how many servers of said at least one server configuration to be included at said site for supporting the expected workload according to one or more service parameters.

13. The method of claim 1, wherein selecting the type of load balancing strategy from among the plurality of types of load balancing strategies is based on evaluating the plurality of types of load balancing strategies for the expected workload.

14. A method comprising:

receiving, into a capacity planning system including a computer system, workload information representing an expected workload of client accesses of streaming media files from a site;

said capacity planning system determining, for at least one server configuration, how many servers of said at least one server configuration to be included at said site for supporting the expected workload in a target manner; and said capacity planning system selecting a type of load balancing strategy from among a plurality of types of load balancing strategies to use for the expected workload;

wherein said determining how many servers of said at least one server configuration to be included at said site for supporting the expected workload in the target manner comprises computing a service demand for said at least one server configuration in supporting said expected workload;

wherein said computing said service demand comprises computing:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk},$$

wherein $$X_w = X_1, \ldots, X_{k_w}$$

is a set or amerent encoding bit rates of files served in the expected workload, $$N_{X_{W_i}}^{memory}$$

is a number of streams in the expected workload having a memory access to a subset of files encoded at $$X_{W_i} \text{ Kb/s}, cost_{X_{W_i}}^{memory}$$

is a cost of consumed resources for a stream having a memory access to a file encoded at $$X_{W_i} \text{ Kb/s}, N_{X_{W_i}}^{disk}$$

is a number of streams in the expected workload having a disk access to a subset of files encoded at $$X_{W_i} \text{ Kb/s, and } cost_{X_{W_i}}^{disk}$$

is a cost of consumed resources for a stream having a disk access to a file encoded at $$X_{W_i} \text{ Kb/s}.$$

15. The method of claim 14 further comprising:
said capacity planning system determining from said computed service demand how many servers of said at least one server configuration to be included at said site for supporting the expected workload in the target manner.

16. The method of claim 14 further comprising:
said capacity planning system determining from said computed service demand whether a single server of said at least one server configuration can support the expected workload in the target manner.

17. The method of claim 16 further comprising:
in response to said capacity planning system determining from said computed service demand that a single server of said at least one server configuration cannot support the expected workload in the target manner, said capacity planning system estimating from said computed service demand a number of servers of said at least one server configuration that can support the expected workload in the target manner.

18. The method of claim 17 further comprising:
said capacity planning system re-evaluating the expected workload for a cluster having the estimated number of servers of said at least one server configuration to compute a service demand for the cluster to determine whether the estimated number of servers is accurate.

19. The method of claim 18 wherein said re-evaluating includes considering a load balancing strategy used by said cluster in supporting the expected workload.

20. A method comprising:
receiving, into a capacity planning tool executed by a computer, information relating to a service level agreement;
receiving, into the capacity planning tool, information about a first server configuration;
receiving, into said capacity planning tool, workload information representing an expected workload of client accesses of streaming media files from a site;
said capacity planning tool determining how many servers of said first server configuration to be included at said site for supporting the expected workload in a manner that complies with the service level agreement; and
said capacity planning tool selecting a type of load balancing strategy from among a plurality of types of load balancing strategies to use for the expected workload,
wherein said determining how many servers of said first server configuration to be included at said site for supporting the expected workload in the manner that complies with the service level agreement comprises:
computing a cost corresponding to resources of said first server configuration that are consumed in supporting the expected workload;
using the computed cost to compute a service demand for said first server configuration in supporting said expected workload, wherein said computing said service demand comprises computing:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk},$$

wherein $$X_w = X_1, \ldots, X_{K_w}$$

is a set of different encoding bit rates of files served in the workload W, $$N_{X_{W_i}}^{memory}$$

is a number of streams in the expected workload having a memory access to a subset of files encoded at $$X_{W_i}$$

Kb/s, $$cost_{X_{W_i}}^{memory}$$

is a cost of consumed resources for a stream having a memory access to a file encoded at $$X_{W_i} Kb/s, N_{X_{W_i}}^{disk}$$

is a number of streams in the expected workload having a disk access to a subset of files encoded at $$X_{W_i} \; Kb/s, \text{ and } cost_{X_{W_i}}^{disk}$$

is a cost of consumed resources for a stream having a disk access to a file encoded at $$X_{W_i}$$

Kb/s.

21. The method of claim 20 wherein said computing said cost comprises:
    computing a cost of consumed resources for a stream in said workload having a memory access to a streaming media file; and
    computing a cost of consumed resources for a stream in said workload having a disk access to a streaming media file.

22. The method of claim 20 further comprising:
    generating a workload profile for a single server of said first server configuration under the expected workload, wherein said workload profile identifies client accesses in the expected workload that are served from memory of the single server of said first server configuration and client accesses in the expected workload that are served from disk of the single server.

23. A method comprising:
    receiving, into a capacity planning tool executed by a computer, information relating to a service level agreement;
    receiving, into the capacity planning tool, information about a first server configuration;
    receiving, into said capacity planning tool, workload information representing an expected workload of client accesses of streaming media files from a site;
    said capacity planning tool determining how many servers of said first server configuration to be included at said site for supporting the expected workload in a manner that complies with the service level agreement; and
    said capacity planning tool selecting a type of load balancing strategy from among a plurality of types of load balancing strategies to use for the expected workload,
    wherein said determining how many servers of said first server configuration to be included at said site for supporting the expected workload in the manner that complies with the service level agreement comprises:
        computing a service demand for resources of a single server of said first server configuration under the expected workload;
        determining from said service demand if said single server has sufficient capacity for supporting the expected workload in the manner that complies with the service level agreement; and
        in response to determining that said single server does not have sufficient capacity for supporting the expected workload in the manner that complies with the service level agreement, estimating from the service demand a number of servers of said first server configuration that when clustered together provide sufficient capacity for supporting the expected workload in the manner that complies with the service level agreement.

24. The method of claim 23, wherein selecting the type of load balancing strategy from among the plurality of types of load balancing strategies is based on evaluating the plurality of types of load balancing strategies for the expected workload.

25. The method of claim 23 further comprising:
    computing a second service demand for resources of the cluster of the number of servers under the expected workload.

26. The method of claim 25 further comprising:
    analyzing the second service demand to verify whether the estimated number of servers is accurate.

27. A method comprising:
    receiving, into a capacity planning tool executed by a computer, information relating to a service level agreement;
    receiving, into the capacity planning tool, information about a first server configuration;
    receiving, into said capacity planning tool, workload information representing an expected workload of client accesses of streaming media files from a site;
    said capacity planning tool determining how many servers of said first server configuration to be included at said site for supporting the expected workload in a manner that complies with the service level agreement;
    said capacity planning tool selecting a type of load balancing strategy from among a plurality of types of load balancing strategies to use for the expected workload; and
    generating a workload profile for a single server of said first server configuration under the expected workload, wherein said workload profile identifies client accesses in the expected workload that are served from memory of the single server of said first server configuration and client accesses in the expected workload that are served from disk of the single server;
    wherein said determining how many servers of said first server configuration to be included at said site for supporting the expected workload in the manner that complies with the service level agreement comprises:
        using the generated workload profile to evaluate the capacity of said single server of said first server configuration to determine whether said single server of said first server configuration has sufficient capacity for supporting the expected workload in the manner that complies with the service level agreement.

28. The method of claim 27 further comprising:
    in response to determining that said single server of the said first server configuration does not have sufficient capacity for supporting the expected workload in the manner that complies with the service level agreement, estimating a number of servers of said first server configuration that when clustered together in a cluster provide sufficient capacity for supporting the expected workload in the manner that complies with the service level agreement and generating a second workload profile for the cluster under the expected workload, wherein said second workload profile identifies client accesses in the expected workload that are served from memory of the cluster of servers of said first server configuration and client accesses in the expected workload that are served from disk of the cluster of servers of said first server configuration.

29. The method of claim 28 wherein said generating said second workload profile comprises determining for each of said number of servers in the cluster the client accesses of the expected workload that are assigned to such server under a load balancing strategy.

30. The method of claim 28 further comprising:

using the generated second workload profile to evaluate the capacity of said cluster of servers of said first server configuration to determine whether said cluster has sufficient capacity for supporting the expected workload in the manner that complies with the service level agreement.

31. A capacity planning system comprising:

at least one central processing unit (CPU);

a capacity planning tool executable on the at least one CPU to:

receive workload information representing an expected workload of client accesses of streaming media files from a site, wherein the workload information identifies a number of concurrent client accesses of said streaming media files from said site over a period of time, and the workload information further identifies types of the client accesses;

determine a number of servers of a given configuration type to be implemented at said site for supporting the expected workload as defined by the workload information according to a service level agreement, wherein the determining is based on:

computing, for resources of a single server of the given configuration type, a service demand under the expected workload, determining from the service demand if the single server has sufficient capacity for supporting the expected workload according to the service level agreement, and in response to determining that the single server does not have sufficient capacity for supporting the expected workload according to the service level agreement, estimating from the service demand the number of servers of the given configuration type that when clustered together in a cluster provide sufficient capacity for supporting the expected workload according to the service level agreement; and select a type of load balancing strategy from among a plurality of types of load balancing strategies to use for the expected workload.

32. The capacity planning system of claim 31, wherein the number of servers of the given configuration type to be implemented at said site for supporting the expected workload comprises a number of the servers of the given configuration type to be implemented at said site for supporting the expected workload according to one or more service parameters.

33. The capacity planning system of claim 31, wherein the type of load balancing strategy selected from among the plurality of types of load balancing strategies is based on evaluating the plurality of types of load balancing strategies for the expected workload.

* * * * *

UNITED STATES PATENT AND TRADEMARK OFFICE
CERTIFICATE OF CORRECTION

PATENT NO.        : 8,145,731 B2  
APPLICATION NO.   : 10/738273  
DATED             : March 27, 2012  
INVENTOR(S)       : Ludmila Cherkasova et al.

Page 1 of 1

It is certified that error appears in the above-identified patent and that said Letters Patent is hereby corrected as shown below:

In the Claims:

In column 35, line 7, in Claim 14, delete "or amerent" and insert -- of different --, therefor.

Signed and Sealed this  
Twenty-eighth Day of May, 2013

Teresa Stanek Rea  
*Acting Director of the United States Patent and Trademark Office*